(12) United States Patent
Momose et al.

(10) Patent No.: US 9,200,577 B2
(45) Date of Patent: Dec. 1, 2015

(54) VIBRATION DAMPING CONTROL DEVICE FOR VEHICLE

(75) Inventors: Hirofumi Momose, Susono (JP); Kaiji Itabashi, Susono (JP); Yoshitaka Oikawa, Susono (JP); Takashi Saito, Susono (JP); Hiroshi Mizuno, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 790 days.

(21) Appl. No.: 13/577,139

(22) PCT Filed: Jan. 20, 2011

(86) PCT No.: PCT/IB2011/000080
§ 371 (c)(1),
(2), (4) Date: Aug. 3, 2012

(87) PCT Pub. No.: WO2011/095855
PCT Pub. Date: Aug. 11, 2011

(65) Prior Publication Data
US 2012/0303243 A1 Nov. 29, 2012

(30) Foreign Application Priority Data

Feb. 3, 2010 (JP) ................................. 2010-022538
May 17, 2010 (JP) ................................. 2010-113723

(51) Int. Cl.
*F02B 75/06* (2006.01)
*F02D 41/00* (2006.01)
(Continued)

(52) U.S. Cl.
CPC ............ *F02D 41/0002* (2013.01); *F02B 75/06* (2013.01); *F02D 11/105* (2013.01); *F02D 41/1402* (2013.01); *B60W 2030/206* (2013.01);
(Continued)

(58) Field of Classification Search
CPC .......................... F02B 75/06; B60W 2030/206
See application file for complete search history.

(56) References Cited

U.S. PATENT DOCUMENTS 5,665,025 A 9/1997 Katoh
2002/0072844 A1 6/2002 Gras et al.
(Continued)

FOREIGN PATENT DOCUMENTS

DE 100 01 396 7/2001
FR 2 910 062 6/2008
(Continued)

OTHER PUBLICATIONS

International Search Report Issued Jul. 27, 2011 in PCT/IB11/000080 Filed Jan. 20, 2011.

*Primary Examiner* — Erick Solis
(74) *Attorney, Agent, or Firm* — Oblon, McClelland, Maier & Neustadt, L.L.P.

(57) ABSTRACT

A vibration damping control device that controls driving power of a vehicle to suppress pitch vibration or bounce vibration includes: a vibration damping control unit that controls a driving torque of an engine so as to suppress the amplitude of the pitch vibration or bounce vibration on the basis of a wheel torque generated at a contact portion between a wheel of the vehicle and a road surface; and a compensating component regulating unit that varies the magnitude of a compensating component, which is calculated by a vibration damping control unit and which compensates the wheel torque for vibration damping control, on the basis of a change of characteristic, such as a wear state quantity of a movable portion of a throttle valve of the engine.

22 Claims, 11 Drawing Sheets

(51) Int. Cl.
  *F02D 11/10*   (2006.01)
  *F02D 41/14*   (2006.01)
  *B60W 30/20*   (2006.01)

(52) U.S. Cl.
  CPC .... *B60W 2710/0605* (2013.01); *F02D 41/1497* (2013.01); *F02D 2011/102* (2013.01); *F02D 2041/1433* (2013.01); *F02D 2200/0404* (2013.01); *F02D 2200/602* (2013.01); *F02D 2250/28* (2013.01); *Y02T 10/42* (2013.01)

(56) References Cited

U.S. PATENT DOCUMENTS

| | | | |
|---|---|---|---|
| 2005/0049761 A1 | 3/2005 | Kataoka et al. | |
| 2012/0265400 A1* | 10/2012 | Oikawa | B60K 6/445 701/37 |
| 2013/0131950 A1* | 5/2013 | Kim | B60W 30/20 701/99 |
| 2014/0183878 A1* | 7/2014 | Minamiguchi | B60W 30/20 290/40 C |
| 2014/0288755 A1* | 9/2014 | Murakami | B60K 6/48 701/22 |
| 2014/0358370 A1* | 12/2014 | Kikuchi | B60T 8/17555 701/37 |

FOREIGN PATENT DOCUMENTS

| | | |
|---|---|---|
| JP | 2004 168148 | 6/2004 |
| JP | 2004 353586 | 12/2004 |
| JP | 2006 69472 | 3/2006 |
| JP | 2009 40163 | 2/2009 |
| WO | 2010 049766 | 5/2010 |

\* cited by examiner

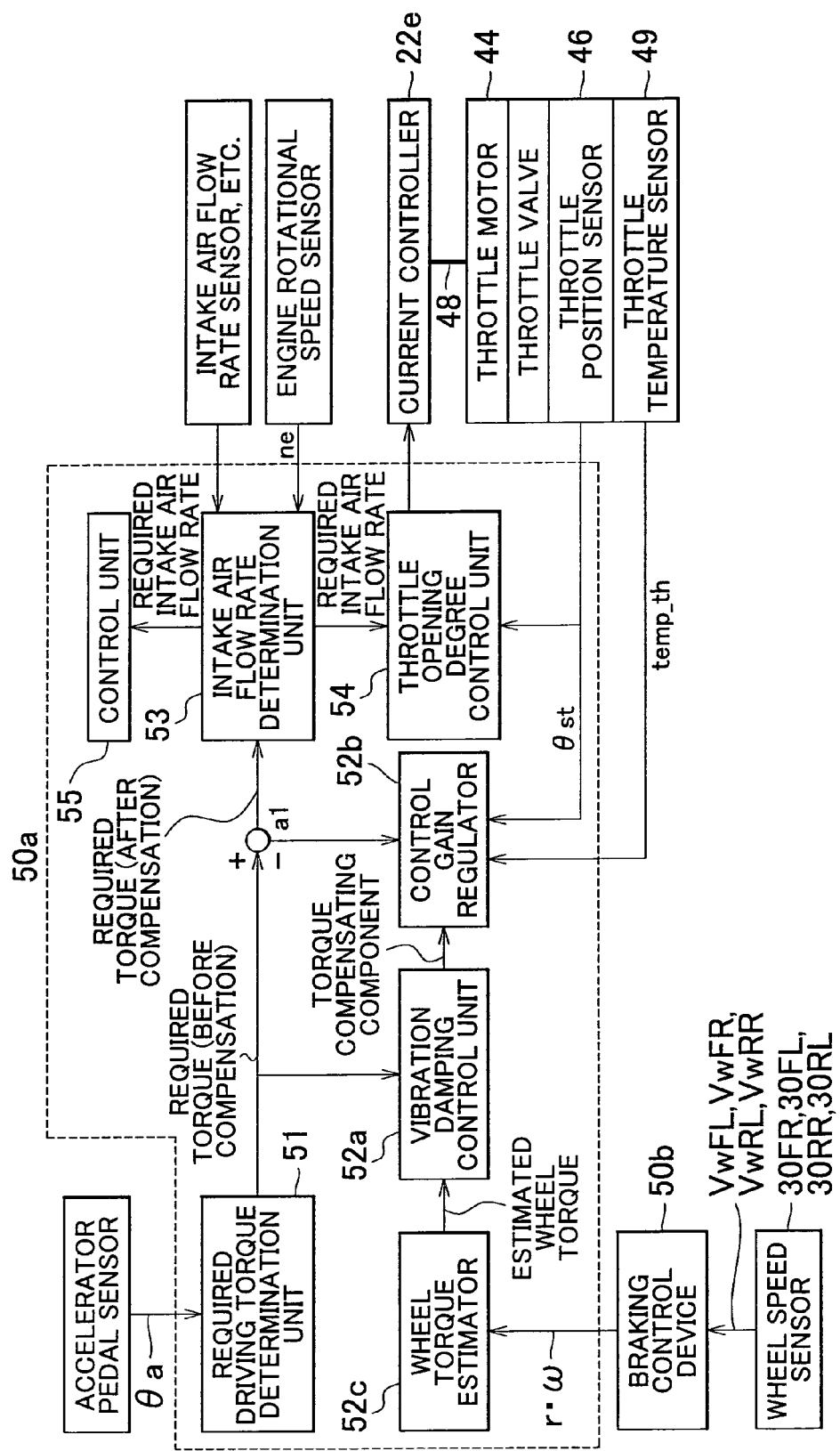

VIBRATION DAMPING CONTROL DEVICE FOR VEHICLE

BACKGROUND OF THE INVENTION

1. Field of the Invention

The invention relates to a vibration damping control device that controls driving power (driving force or driving torque) of a vehicle, such as an automobile, that uses an engine as a driving device to suppress vibration of a vehicle body and, more particularly, to a configuration for managing the state of a throttle valve of the engine in vibration damping control.

2. Description of the Related Art

Vibration, such as pitch and bounce, during running of a vehicle occurs because of braking and driving forces (or inertial force) acting on a vehicle body during acceleration or deceleration of the vehicle or another external force acting on the vehicle body. Those forces are reflected on a "wheel torque" that is exerted on a road surface (torque acting between wheels and a contact road surface) by each wheel (driving wheel during driving). Then, in the field of vibration damping control for a vehicle, Japanese Patent Application Publications No 2004-168148, No. 2006-69472 and No. 2009-40163 (JP-A-2004-168148, JP-A-2006-69472 and JP-A-2009-40163) describe that wheel torque is regulated through driving power control over an engine or another driving device of the vehicle to thereby suppress vibration of a vehicle body during running of the vehicle. In the vibration damping control over vibration through driving power control, a movement model constructed by assuming a so-called mechanical model of sprung mass vibration or sprung and unsprung mass vibration of the vehicle body is used to estimate pitch and bounce vibration that occurs in the vehicle when acceleration or deceleration is required of the vehicle or when an external force (disturbance) acts on the vehicle body to cause the wheel torque to fluctuate, and then regulate the driving power of the driving device of the vehicle so as to suppress the estimated vibration. In the case of vibration damping control of this type, the source of force that generates vibration is regulated to suppress generation of vibration energy rather than generated vibration energy is absorbed and suppressed like vibration damping control through a suspension, so it is advantageous that vibration damping action is relatively quick and energy efficiency is high. In addition, in the vibration damping control as described above, a control target is narrowed to the wheel torque or the braking and driving force of each wheel, so it is relatively easy to regulate the control.

In the above vibration damping control through driving power control, the wheel torque is regulated so as to suppress pitch and bounce vibration of the vehicle, so the power of the driving device is frequently and vibrationally varied as compared with normal times. Particularly, when the vibration damping control is executed in a gasoline engine vehicle, an vibrational variation of the opening degree of a throttle valve is required to regulate the intake air flow rate of the engine. Thus, movable portions (for example, gear teeth, gear bearings, and the like) of the throttle valve frequently move. This may advance a change of state (hereinafter, referred to as "change of characteristic") that causes a change of operating characteristic of the throttle valve, such as wear and thermal deformation of those movable portions, earlier than normal times. Thus, when a gasoline engine vehicle is equipped with the above vibration damping control device, it is necessary to manage the "change of characteristic" in such a manner that control operation is regulated so that the amount of wear, thermal deformation, or the like, of the movable portions of the throttle valve falls within a predetermined range (criteria) before the vehicle reaches the end of service life (management of the change of characteristic of the throttle valve). In addition, the change of characteristic, such as the degree of advance of wear or thermal deformation of the throttle valve movable portions due to operation of vibration damping control through driving power control depends on the condition of a running road of the vehicle. For example, on a bad road, as the vibration of the vehicle body increases, the amount and frequency of operation of vibration damping control increase. It is not appropriate to simply manage such change of characteristic on the basis of the travel distance or service age of the vehicle. For example, it is presumable that a certain limitation is set for the travel distance, service age of the vehicle or the operating time of the control and then operation of the control is prohibited when those limitations are exceeded. However, as is already described above, the degree of advance of wear or thermal deformation of the throttle valve movable portions depends on the condition of a running road. Therefore, there may be a case where the change of characteristic, such as the degree of wear or thermal deformation, has advanced to an allowable limit when the set limitation has been reached or a case where there is still a sufficient allowance up to the allowable limit. Thus, it is desirable that the change of characteristic of the throttle valve is managed directly on the basis of the degree of advance of wear of the throttle valve movable portions or the "change of another characteristic".

SUMMARY OF INVENTION

The invention provides a vibration damping control device that uses driving power control equipped for a vehicle. More specifically, the invention provides a device that is able to manage a change of characteristic, such as a wear state of a throttle valve movable portion, so that the change of characteristic, such as wear of the throttle valve movable portion, does not exceed an allowable limit before the vehicle reaches the end of the service life.

A first aspect of the invention relates to a vibration damping control device for a vehicle, which executed vibration damping control in which driving power of the vehicle is controlled to suppress pitch or bounce vibration of the vehicle. The control device includes: a vibration damping control unit that controls a driving torque of an engine so as to suppress the amplitude of pitch or bounce vibration on the basis of a wheel torque that is generated at a contact portion between a wheel of the vehicle and a road surface and that acts on the wheel; and a compensating component regulating unit that varies the magnitude of a compensating component on the basis of a change of characteristic of a movable portion of a throttle valve of the engine, wherein the compensating component is calculated by the vibration damping control unit and compensates the wheel torque for the vibration damping control. Here, the "movable portion of the throttle valve" is a portion that operates when the throttle valve opens or closes or the opening degree of the throttle valve varies. For example, the movable portion of the throttle valve may include various gears for driving a valve body, bearings of gears, bearings of a motor shaft, a valve body drive shaft, bearings of the valve body drive shaft, a brush, a commutator, a spring, an end portion of a screw for setting the opening degree, and the like. The compensating component regulating unit may reduce the magnitude of the compensating component on the basis of the change of characteristic. In addition, the "change of characteristic" may be any index that indicates the degree of advance of a change of state or a state itself (including a state after the change of characteristic) that causes a change of operation characteristic of the throttle valve movable portion due to wear, heat, or the like. For example, as long as the change of characteristic is any index value that indicates the degree of advance of wear or the state of wear (hereinafter, referred to as "wear state quantity"), the change of characteristic may be a deviation from a designed value on the surface of the movable portion (due to wear) or the dimensions of a lost portion due to wear (a variation from a designed length, thickness or size; hereinafter, referred to as "wear amount").

With the above configuration, the magnitude of the compensating component is varied on the basis of the change of characteristic (for example, wear state quantity) of the movable portion of the throttle valve of the engine. By so doing, it is possible to regulate the operation amount of the throttle valve, so it is possible to manage the change of characteristic of the throttle valve so that the change of characteristic (for example, wear) of the throttle valve movable portion does not excessively advance or does not exceed an allowable limit before the vehicle reaches the end of the service life. Specifically, the compensating component regulating unit may be configured to reduce the magnitude of the compensating component of vibration damping control on the basis of the change of characteristic (for example, wear state quantity), more specifically, in association with an increase in the change of characteristic to thereby suppress fluctuations of the throttle opening degree corresponding to the magnitude of the compensating component as the change of characteristic advances. In addition, the compensating component regulating unit may forcibly set the magnitude of the compensating component of vibration damping control to 0 or stop the control when the change of characteristic (wear state quantity) has reached a predetermined threshold. In any case, operation of the throttle valve movable portion is limited in association with suppression of fluctuations of the throttle opening degree, so it is possible to delay the advance of the change of characteristic, such as wear, of the movable portion or to prevent further advance of the change of characteristic, such as wear. Thus, the throttle valve movable portion is protected so that the change of characteristic of the throttle valve movable portion does not excessively advance before the vehicle reaches the end of the service life. Note that the magnitude of the compensating component may be regulated by the compensating component regulating unit in such a manner that a control gain of the compensating component is varied. In this case, when the control is stopped, the control gain is set to 0.

In the configuration of the device, the change of characteristic of the throttle valve movable portion may be determined through any method. For example, when the wear state quantity is referred to as the change of characteristic, the degree of advance or state of wear of the throttle valve movable portion depends on the frequency of change of the throttle opening degree and the displacement (stroke) of the valve body, so the wear state quantity may be determined on the basis of a variation of the throttle opening degree. In addition, generally, as the displacement of the valve body accumulatively elongates, the degree of advance or state of wear of the throttle valve movable portion presumably increases, so the wear state quantity may be estimated on the basis of an accumulated value of the variation of the opening degree of the throttle valve. In this case, the accumulated value of the variation of the throttle opening degree may be given on the basis of the frequency and amplitude of the variation of the throttle opening degree. Furthermore, according to the research made by the inventors of the invention, it is found that the wear state quantity corresponding to the degree of advance or state of wear of the throttle valve movable portion also depends on the temperature near the throttle valve (as the temperature increases, the rate of advance of wear increases) and the wear amount (as the wear amount increases, the rate of advance of wear decreases). Thus, the wear state quantity may be determined in consideration of these values. Furthermore, force that acts on the throttle valve movable portion to cause wear varies depending on the throttle opening degree, that is, the position of the valve body, and, accordingly, an increase in wear state quantity (the rate of advance of wear) of the throttle valve movable portion also varies, so, in calculating the wear state quantity, an increase in the wear state quantity may be set so as to vary depending on the throttle opening degree. As is described in detail in the following embodiment, in a general throttle valve, when the valve body is located near the opening degree center position, force acting on the movable portion relatively reduces and the movable portion is hard to wear as compared with when the valve body is located away from the opening degree center position. Then, the above device may be set so that an increase in the wear state quantity reduces as the valve body approaches the opening degree center. Note that, in the above series of configurations, the referenced throttle opening degree may be any one of a required throttle opening degree and an actual throttle opening degree.

With the configuration that estimates the wear state quantity, there is provided a new vibration damping control device that is able to identify the degree of advance of wear of the throttle valve movable portion during running of the vehicle and then reflect the result on vibration damping control. A second aspect of the invention relates to a vibration damping control device for a vehicle, which executes vibration damping control in which driving power of the vehicle is controlled to suppress pitch or bounce vibration of the vehicle. The device includes a wear state quantity estimating unit that estimates a wear state quantity of a movable portion of a throttle valve of an engine on the basis of a variation of the throttle opening degree, wherein the vibration damping control uses the wear state quantity to determine the magnitude of a compensating component of the driving power. In this case as well, the wear state quantity may be estimated on the basis of an accumulated value of the variation of the throttle opening degree, and an increase in the wear state quantity may be set so as to reduce as the position of the valve body of the throttle valve approaches the opening degree center position. In addition, the wear state quantity may be determined in consideration of the temperature near the throttle valve and the wear amount as well as the above described case.

Note that, as described above, the configuration that the operation of the movable portion of the throttle valve, that is, the frequency of change of the throttle opening degree, the displacement of the valve body, and the like, are accumulated to estimate the change of characteristic, such as the wear amount, of the movable portion of the throttle valve may be utilized for a purpose other than the purpose of the vibration damping control device. Another aspect of the invention relates to a throttle valve characteristic change estimating device. The device estimates a change of characteristic of a movable portion of a throttle valve of an engine of a vehicle on the basis of operation (mechanical load, such as speed, displacement and torque) of the throttle valve.

In addition, as is understood from the above series of description, the device to which the aspect of the invention is applied may be regarded as a device uses driving power control to avoid or reduce further transmission of a vibration component, input from a road surface through a wheel, to a vehicle body in a vehicle, such as an automobile, in which driving power is regulated by throttle opening degree control of a gasoline engine. In other words, it may also be regarded as a driving control device that is configured so that, when vibration (usually, about 1 to 4 Hz) that causes vibration of the vehicle body is generated (or is presumed to be generated) in a wheel speed or a wheel torque, a torque opposite in phase to the vibration is applied to the wheel. Then, particularly, a subject of the invention is such that, when a vibration component is input from a road surface to a vehicle, the device is used to avoid excessive advance of a change of characteristic, such as wear, of a throttle valve movable portion due to frequent fluctuations of the throttle opening degree as compared with when no vibration component is input. Another aspect of the invention relates to a vehicle. The vehicle controls a throttle opening degree so as to suppress a vibration component input from a road surface. In the vehicle, a variation of the throttle opening degree is reduced when a wear state quantity of a movable portion of the throttle valve is high as compared with when the wear state quantity is low. With the above configuration, when the degree of wear of the throttle valve movable portion advances, a variation of the throttle opening degree for vibration damping control is limited to avoid further advance of wear, so the throttle valve movable portion is protected. In addition, another aspect of the invention relates to a vehicle that controls a throttle opening degree so as to suppress a vibration component input from a road surface. The vehicle may be configured to change control of the throttle valve for suppressing the vibration component on the basis of a change of characteristic of a movable portion of the throttle valve. In the above configuration, the change of characteristic of the throttle valve movable portion may be determined by any method that detects a phenomenon causing a change of the operation characteristic of the throttle valve from the start of usage of the throttle valve.

Furthermore, in managing the change of characteristic of the throttle valve, such as the degree of advance of wear, as described above, a change of characteristic of the throttle valve due to vibration damping control and a change of characteristic due to normal operation of the throttle valve may be separately monitored. Another aspect of the invention relates to a vibration damping control device for a vehicle, which executes vibration damping control by controlling driving power of the vehicle. The device separately manages a change of characteristic of a throttle valve of an engine of the vehicle due to the vibration damping control and a change of characteristic of the throttle valve due to normal throttle valve control. Here, the "normal throttle valve control" includes throttle valve operation control corresponding to a driver's driving request, such as driver's operation of an accelerator pedal, or throttle valve operation control corresponding to a driving request required through any automatic control equipped for the vehicle. In addition, in the above device as well, the change of characteristic may be a wear state quantity of the throttle valve movable portion. With the above configuration, the change of characteristic of the throttle valve due to vibration damping control may be separately monitored from the change of characteristic of the throttle valve due to another factor, so it is advantageous in monitoring the change of state of the vehicle or maintaining the vehicle.

As an embodiment of a specific configuration for separately managing the change of characteristic of the throttle valve due to the vibration damping control and the change of characteristic of the throttle valve due to normal throttle valve control, the vibration damping control device may, for example, include a wear state quantity calculation unit that calculates a wear state quantity of a movable portion of the throttle valve of the engine due to operation of the throttle valve based on a compensating component that is calculated by the vibration damping control unit and that compensates the wheel torque for the vibration damping control, in addition to a vibration damping control unit that controls a driving torque of the engine so as to suppress the amplitude of pitch or bounce vibration on the basis of the wheel torque. In terms of this point, as is already described above, force that acts on the throttle valve movable portion to cause wear varies depending on the throttle opening degree, that is, the position of the valve body, and an increase in the wear state quantity of the throttle valve movable portion also varies depending on the absolute magnitude of the throttle opening degree. Thus, when the wear state quantity due to only the compensating component is calculated as well, it is necessary to consider the absolute magnitude of the throttle opening degree. Then, the wear state quantity here may be, for example, calculated on the basis of a component obtained by adding a vibration component based on a compensating component in a variation of a throttle opening degree to a variation of a vibration center position of the vibration component, or given by subtracting a wear state quantity determined on the basis of a throttle opening degree or driving control amount corresponding to driving power that is not compensated by the compensating component from a wear state quantity determined on the basis of a throttle opening degree or driving control amount corresponding to driving power that has been compensated by the compensating component. Note that, when the change of characteristic or wear state quantity due to the compensating component is monitored as well, the magnitude of the compensating component may be varied on the basis of the change of characteristic or the wear state quantity, and, more specifically, the magnitude of the compensating component may be reduced in accordance with an increase in the change of characteristic or the wear state quantity, or the magnitude of the compensating component of vibration damping control may be forcibly set to 0 or the control is stopped when the change of characteristic or the wear state quantity has reached a predetermined threshold.

In the above vibration damping control device, when the change of characteristic, such as wear, of the throttle valve advances to some degree, vibration damping control by means of intake air regulation of the throttle valve is desirably restricted in order to avoid further advance of the change of characteristic. However, when the vehicle is equipped with means or device that is able to vary driving power corresponding to the compensating component of vibration damping control in addition to intake air regulation of the throttle valve, the means or device may be used to execute vibration damping control. Another aspect of the invention relates to a vibration damping control device for a vehicle, which executes vibration damping control in which driving power of the vehicle is controlled to suppress pitch or bounce vibration of the vehicle. The device changes means for regulating driving power for vibration damping control from a throttle valve of an engine of the vehicle to means other than the throttle valve in accordance with the change of characteristic of the throttle valve of the engine. In the above device as well, the change of characteristic may be a wear state quantity of the movable portion of the throttle valve or driving power for vibration damping control may be regulated by other means when the wear state quantity exceeds a predetermined value. For example, any control that is able to increase or decrease driving power of the engine, such as engine ignition angle control, intake valve lift control and alternator operation control, may be selected as the other means for vibration damping control instead of the throttle valve to thereby regulate driving power. With the above configuration, even when the change of characteristic, such as wear, of the throttle valve advances and then vibration damping control by means of intake air regulation of the throttle valve should be restricted, it is possible to continue vibration damping control through driving power control.

Incidentally, as is already described above, force that acts on the throttle valve movable portion to cause wear varies depending on the throttle opening degree. Thus, an increase in the change of characteristic or wear state quantity of the throttle valve also varies depending on the absolute magnitude of the throttle opening degree. In addition, depending on a situation of usage of the vehicle, the frequency at which the throttle opening degree becomes a specific value, that is, the frequency at which the valve body is located in a specific portion or area, may be high and, therefore, vibration caused by vibration damping control may be frequently generated in the portion or area. That is, the degree of advance of wear in the throttle valve varies by the position of the valve body, that is, the throttle opening degree, and wear may advance at a specific portion of the throttle valve depending on a situation of usage of the vehicle. Another aspect of the invention relates to a throttle valve wear portion estimating device that estimates a portion at which wear has advanced (wear portion) in a throttle valve of an engine of the vehicle. In order to estimate or detect the wear portion, specifically, the device may calculate a wear state quantity of the throttle valve for each throttle opening degree or for each area within a variation range of the throttle opening degree to thereby make it possible to identify the wear portion. With the above configuration, it is possible to estimate a portion at which wear has advanced, and it is possible to manage the state of wear for each position or area of the throttle opening degree. For example, when the position or region near the position of the valve body corresponding to the throttle opening degree that achieves a required engine intake air flow rate corresponds to a wear portion and then oscillatory operation of the throttle valve in the position or area should be restricted, vibration damping control is stopped or the magnitude of the amplitude of the compensating component is reduced only when the valve body is located in the position or area to thereby make it possible to suppress further advance of wear in the position or area. Note that it may be determined whether a required throttle opening degree corresponds to a wear portion on the basis of whether the wear state quantity of the movable portion of the throttle valve of the engine at the throttle opening degree corresponding to the required engine intake air flow rate exceeds a predetermined threshold.

In addition, in terms of this point, when the vehicle is equipped with means or device that is able to regulate an intake air flow rate or air-fuel ratio of an engine, other than a throttle valve, such as a sub-throttle valve or an EGR device, the means or device that is able to regulate the intake air flow rate or air-fuel ratio may be used to vary the intake air flow rate at which intake air is supplied to the engine and the position (vibration center position) of the throttle opening degree may be offset. Another aspect of the invention relates to a vibration damping control device for a vehicle, which executes vibration damping control in which driving power of the vehicle is controlled to suppress pitch or bounce vibration of the vehicle. The device estimates a wear portion of a movable portion of a throttle valve of an engine, and, when a required throttle opening degree corresponds to the wear portion, the device varies the required throttle opening degree from the throttle opening degree corresponding to a required engine intake air flow rate and varies the intake air flow rate by intake air flow rate control means other than the throttle valve.

Note that it may be determined whether a required throttle opening degree corresponds to the wear portion on the basis of whether the wear state quantity of the movable portion of the throttle valve of the engine at the throttle opening degree corresponding to the required engine intake air flow rate exceeds a predetermined threshold as in the case of the above. With the above configuration, when wear has advanced in part of the positions or areas of the throttle opening degree, it is possible to continue vibration damping control while avoiding the part of positions or areas, so it is possible to execute vibration damping control and use throttle valve for a further long period of time. Note that varying the intake air flow rate by the intake air flow rate control means other than the throttle valve may be carried out so as to compensate for a variation in the throttle opening degree or may be carried out so as to achieve a total required engine intake air flow rate.

Furthermore, it is applicable that other intake air flow rate control means is not used but any control that is able to increase or decrease driving power of an engine, such as engine ignition angle control, intake valve lift control and alternator operation control, is used to vary the intake air flow rate that should be achieved by the throttle valve to thereby carry out an offset of the throttle opening degree. Another aspect of the invention relates to a vibration damping control device for a vehicle, which executes vibration damping control in which driving power of the vehicle is controlled to suppress pitch or bounce vibration of the vehicle. When a wear state quantity of a movable portion of the throttle valve of the engine at the throttle opening degree corresponding to the required engine intake air flow rate exceeds a predetermined threshold, the device varies the required throttle opening degree from the throttle opening degree corresponding to a required engine intake air flow rate and varies a control amount by driving power control means other than the throttle valve.

Note that in the above described series of devices according to the aspects of the invention, for the purpose of managing the change of characteristic of the throttle valve, such as the degree of advance of wear of the throttle valve movable portion, it is desirable that a user, manager, mechanic, or the like, of the vehicle can check the change of characteristic or wear state quantity of the throttle valve or information as to whether the change of characteristic or wear state quantity exceeds a predetermined threshold. Thus, a further aspect of the invention provides a vibration damping control device that includes a device that provides information about a change of characteristic of a movable portion of a throttle valve of an engine of a vehicle or a wear state quantity information providing unit that provides information about a wear state quantity of a movable portion of a throttle valve of an engine, wherein the vibration damping control uses the information to determine the magnitude of a compensating component of driving power. With the above configuration, the change of characteristic or wear state quantity of the throttle valve may be referred to by a user, manager, mechanic, or the like, of the vehicle, so it is advantageously easily determine whether to perform repair, replacement, or the like, of the throttle valve without directly observing the movable portion, or the like, of the throttle valve or actually measuring the wear amount.

Another aspect of the invention relates to a vibration damping control method for a vehicle, which executes vibration damping control in which driving power of the vehicle is controlled to suppress pitch vibration or bounce vibration of the vehicle. The method includes: calculating a required driving torque that is a torque required of the vehicle; calculating a wheel torque that is generated at a portion at which a wheel of the vehicle contacts a road surface and that acts on the wheel; calculating a change of characteristic of a movable portion of a throttle valve of the engine; and varying the required driving torque so as to suppress the amplitude of the pitch vibration or bounce vibration on the basis of the required driving torque, the wheel torque and the change of characteristic.

In addition, another aspect of the invention relates to a vibration damping control method for a vehicle, which executes vibration damping control in which driving power of the vehicle is controlled to suppress pitch vibration or bounce vibration of the vehicle. The method includes: estimating a wear state quantity of a movable portion of a throttle valve of an engine on the basis of a variation of the opening degree of the throttle valve; and determining the magnitude of a compensating component of driving power of the engine on the basis of the wear state quantity.

In addition, another aspect of the invention relates to a control method for a vehicle, which controls an opening degree of a throttle valve so as to suppress a vibration component input from a road surface. The method includes: calculating a wear state quantity of a movable portion of the throttle valve; and reducing a variation of the opening degree of the throttle valve when the wear state quantity is higher than a predetermined value.

In addition, another aspect of the invention relates to a control method for a vehicle, which controls an opening degree of a throttle valve so as to suppress a vibration component input from a road surface. The method includes: calculating a change of characteristic of a movable portion of the throttle valve; and changing control of the throttle valve for suppressing the vibration component on the basis of the change of characteristic.

In addition, another aspect of the invention relates to a vibration damping control method for a vehicle, which executes vibration damping control in which driving power of the vehicle is controlled to suppress pitch vibration or bounce vibration of the vehicle. The method includes: estimating a wear portion of a movable portion of a throttle valve of an engine; and reducing the magnitude of a compensating component that compensates a wheel torque for the vibration damping control when a required opening degree of the throttle valve corresponds to the wear portion.

In addition, another aspect of the invention relates to a vibration damping control method for a vehicle that includes a throttle valve and a second intake air flow rate regulating unit in order to regulate an engine intake air flow rate, wherein the vibration damping control method executes vibration damping control in which driving power of the vehicle is controlled to suppress pitch vibration or bounce vibration of the vehicle. The method includes: estimating a wear portion of a movable portion of the throttle valve; and, when a required opening degree of the throttle valve corresponds to the wear portion, varying the required opening degree from the opening degree corresponding to a required engine intake air flow rate and varying the intake air flow rate by the second intake air flow rate regulating unit.

In addition, another aspect of the invention relates to a vibration damping control method for a vehicle that includes a throttle valve and a second intake air flow rate regulating unit in order to regulate an engine intake air flow rate, wherein the vibration damping control method executes vibration damping control in which driving power of the vehicle is controlled to suppress pitch vibration or bounce vibration of the vehicle. The method includes: calculating a change of characteristic of the throttle valve; and changing means for regulating the driving power from the throttle valve to the second intake air flow rate regulating unit in accordance with the change of characteristic.

As is already described above, vibration damping control using driving power control, described in the aspects of the invention, requires frequent variations of power as compared with existing driving power control, so, when the vibration damping control is applied to a gasoline engine vehicle, the change of characteristic, such as wear and thermal deformation, of the throttle valve movable portion tends to easily advance; however, this fact is not pointed out until the present time, and a technique for managing the change of characteristic, such as wear and thermal deformation, or handling easy advance of the change of characteristic has not been suggested. According to the above aspects of the invention, it is impossible to stop the change of characteristic, such as wear and thermal deformation, during vibration damping control; however, the change of characteristic of the throttle valve, such as the degree of advance of wear of the throttle valve movable portion, is appropriately managed to thereby make it possible to reduce operation of vibration damping control, stop the control or use alternative means when the change of characteristic, such as wear and thermal deformation, has advanced to some degree to thereby make it possible to suppress further advance of the change of characteristic, such as wear and thermal deformation, so it is possible to ensure the safety of operation of the throttle valve movable portion through normal driving operation of the vehicle until the end of the service life of the vehicle. In addition, some aspects of the invention provide a configuration that identifies a wear state of a throttle valve movable portion during running of a vehicle. The above configuration may be advantageously used to manage the wear state of the throttle valve movable portion.

BRIEF DESCRIPTION OF DRAWINGS

The features, advantages, and technical and industrial significance of this invention will be described below with reference to the accompanying drawings, in which like numerals denote like elements, and wherein:

FIG. 1B and FIG. 1C are schematic views of an electronically controlled throttle valve (or throttle body) used in an engine of the vehicle shown in FIG. 1A, in which FIG. 1B is a front view of a valve body (when viewed in the same direction as the flow of air in an intake pipe and FIG. 1C is a cross-sectional view when the valve body shown in FIG. 1B is viewed from a side;

FIG. 2A is a control block diagram of the internal configuration of an electronic control unit shown in FIG. 1A;

FIG. 6A to FIG. 6D are control block diagrams of some examples of the configuration for correcting a control mode that uses a compensating component of vibration damping control on the basis of a wear amount WE (or WEx, WE($\phi\kappa$)) in the vibration damping control device according to the embodiment of the invention, in which FIG. 6A shows a case where a control gain $\lambda$ is determined on the basis of the wear amount WE, FIG. 6B shows a case where it is determined whether to transmit a compensating component U to an adder a1 on the basis of the wear amount WE, FIG. 6C shows a case where a cut-off frequency fc of an LPF for removing a high-frequency component from a compensating component U is regulated on the basis of the wear amount WE to control the amplitude of the compensating component, and FIG. 6D shows a case where vibration damping control is executed by a method, other than intake air flow rate control using a throttle valve, on the basis of the wear amount WE;

DETAILED DESCRIPTION OF EMBODIMENTS

Figure 1A:
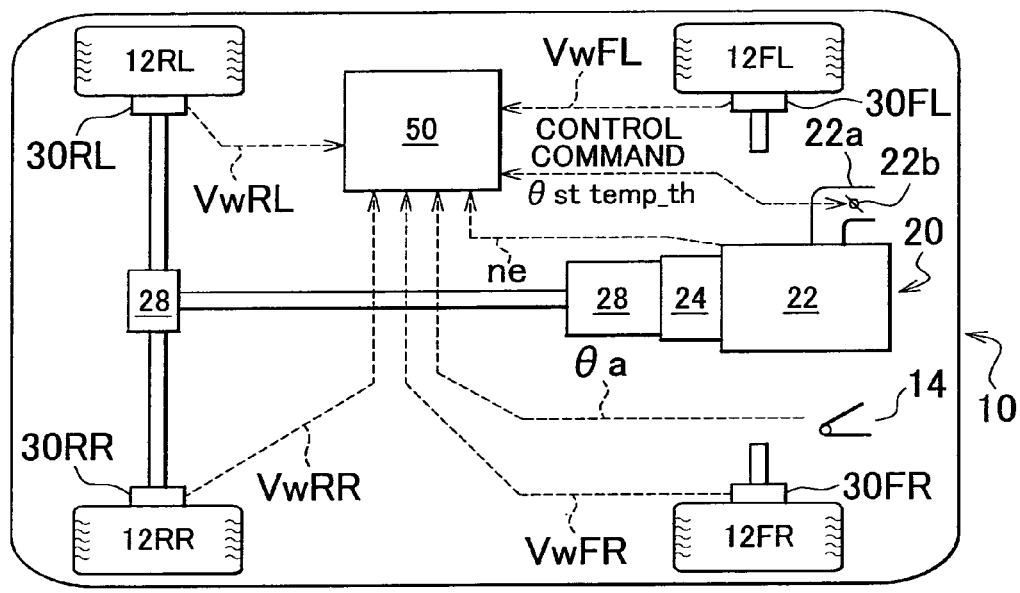
FIG. 1A is a schematic view of a vehicle to which a vibration damping control device according to an embodiment of the invention is installed.

FIG. 1A schematically shows a vehicle, such as an automobile, equipped with a driving control device that executes vibration damping control according to an embodiment of the invention. In the drawing, the vehicle 10 includes a front left wheel 12FL, a front right wheel 12FR, a rear left wheel 12RL and a rear right wheel 12RR, and includes a driving device 20 that generates driving force or driving torque in accordance with driver's operation of an accelerator pedal 14 in a normal mode. In the example shown in the drawing, the driving device 20 is configured to transmit driving torque or rotational driving force from an engine 22 to the rear wheels 12RL and 12RR via a torque converter 24, an automatic transmission 26, a differential gear unit 28, and the like. Note that, although not shown in the drawing for the sake of simplification, the vehicle 10 includes a braking system and a steering system. The braking system generates braking force at each wheel as in the case of an ordinary vehicle. The steering system is used to control the rudder angle of the front wheels or front and rear wheels. In addition, the vehicle may be a four-wheel drive vehicle or a front-wheel drive vehicle.

Figure 1B:
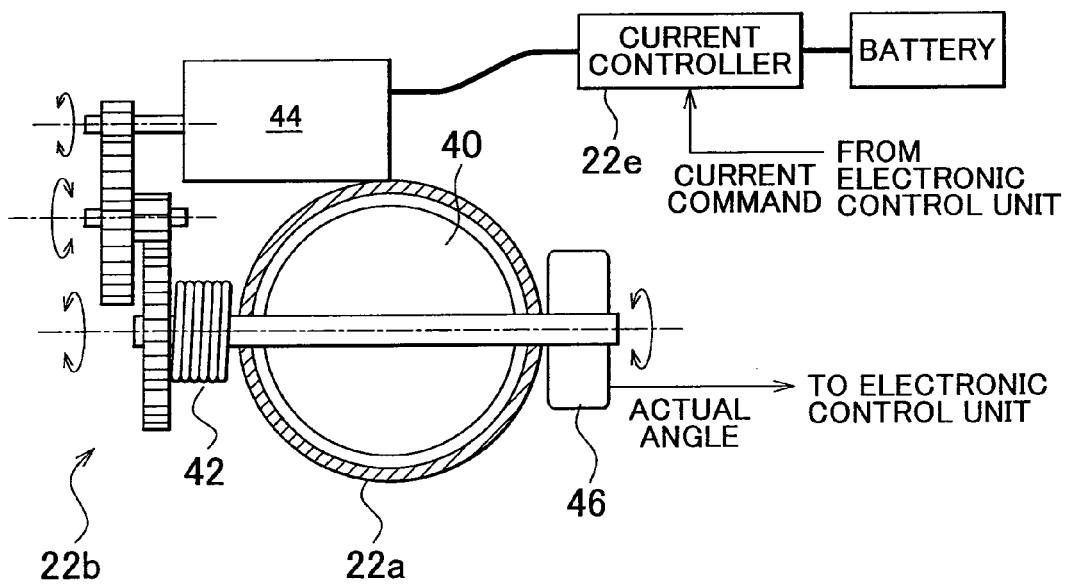
Figure 1C:
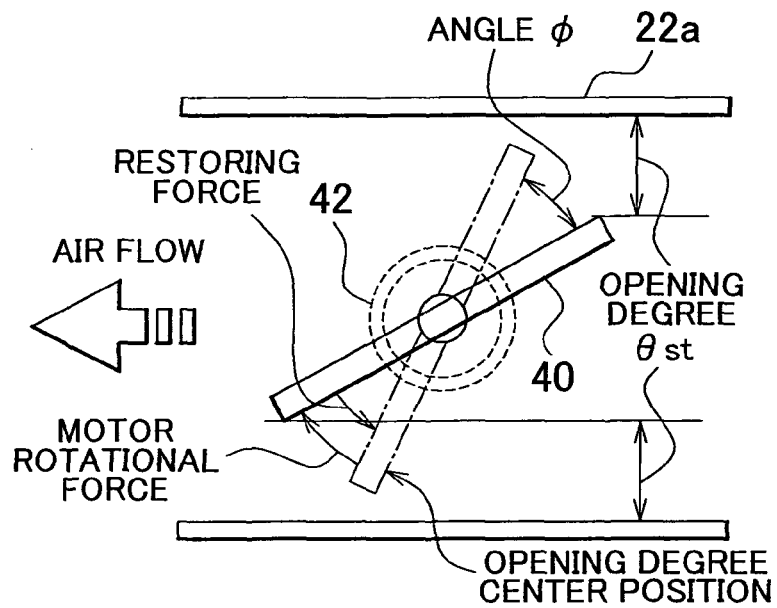

The engine 22 may be a gasoline engine of any type. An electrically controlled throttle valve device 22b of any type as schematically shown in FIG. 1B and FIG. 1C is provided in an intake pipe 22a in order to regulate the intake air flow rate so as to achieve a required driving torque determined on the basis of an operation amount of the accelerator pedal and a control amount described below. As shown in FIG. 1B, in the throttle valve device 22b, a valve body 40 is assembled in the intake pipe 22a so as to be rotatable about a rotation axis vertical to the direction of flow of air, and the air flow passage area of the intake pipe, that is, "throttle opening degree $\theta$st", is increased or decreased in accordance with the angular position of the valve body 40. The angular position of the valve body 40 or the throttle opening degree is monitored by a throttle position sensor 46 under control of an electronic control unit 50, which will be described later. A throttle motor 44 rotates the valve body 40 against the restoring force of a return spring 42 so that the throttle opening degree coincides with a required throttle opening degree that achieves a required intake air flow rate (that is, driving torque). By so doing, the angular position of the valve body 40 or the throttle opening degree is regulated. The throttle motor 44 may be a DC motor or a stepping motor that is employed as a general throttle motor. The rotational force of the throttle motor 44 is regulated in such a manner that a current controller 22e controls a current supplied from a battery to the throttle motor 44 via a power conducting wire on the basis of a current command value given from the electronic control unit 50. The current controller 22e supplies current from the battery to the motor 44 on the basis of a control command from the electronic control unit, and then the motor 44 generates rotational force against the restoring force of the return spring so that the opening degree $\theta$st or angular position $\psi$ of the valve body 40 coincides with a required opening degree or a target angle.

Figure 1D:
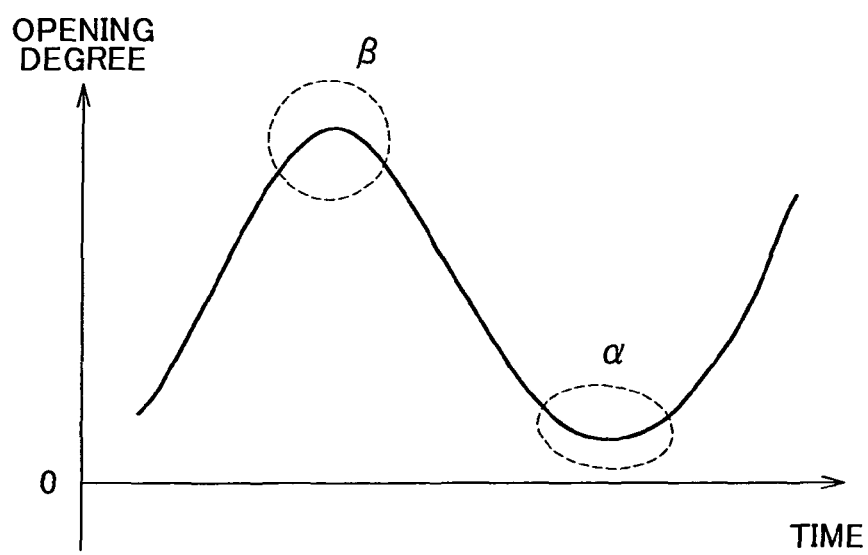
FIG. 1D is a graph that represents an example of a variation of a throttle opening degree that vibrationally varies.

The valve body of the throttle valve device is mechanically configured to vary its angular position in accordance with a balance between the spring force of the return spring 42 and the rotational force of the throttle motor 44. Therefore, wear occurs at various portions that drive the valve body, that is, surfaces of movable portions (gears, a valve body shaft, a motor shaft, bearings, a brush, a commutator, and the like, in the motor), each time the angular position varies. Particularly, while vibration damping control is being executed by the device according to the present embodiment, it is required to vibrationally vary the angular position at a frequency higher than that when no vibration damping control is executed, so wear may early advance by that much. Then, as will be described in detail later, the device according to the present embodiment estimates the state of wear of the movable portions from displacement operation of the valve body (variation of the throttle opening degree), and regulates the amount of vibration damping control on the basis of the estimated result. In terms of this point, when there is no rotational force of the throttle motor 44, the valve body 40 is located at an angular position at which no spring force of the return spring 42 acts, that is, opening degree center position (in FIG. 1C, the state indicated by the alternate long and short dash line). When the valve body 40 is located at the opening degree center position, force acting on the movable portions that drive the valve body is minimal. Then, as the position of the valve body 40 is distanced from the opening degree center position, force acting on the movable portions that drive the valve body increases. Thus, for example, as illustrated in FIG. 1D, when the opening degree vibrationally varies, force acting on the movable portions is larger when the valve body is located in a region β that is set away from the opening degree center position than when the valve body is located in a region α close to the opening degree center position. This causes wear to easily advance on the surfaces of the movable portions. The above finding is considered in estimating the state of wear of the movable portions. In FIG. 1D, force acting on the movable portions is larger in the region β remote from the opening degree center position O than in the region α, and wear early advances.

Referring back to FIG. 1A, the driving power of the engine 22 is controlled by the electronic control unit 50. The electronic control unit 50 may include a general microcomputer and a driving circuit. The microcomputer has a CPU, a ROM, a RAM and input and output ports that are coupled to one another via a bidirectional common bus. The electronic control unit 50 receives a signal that indicates a wheel speed Vwi (i=FL, FR, RL, RR) from a wheel speed sensor 30i (i=FL, FR, RL, RR) provided for each wheel, a signal that indicates the angular position φ or throttle opening degree θst of the throttle valve from the throttle position sensor 46, and signals that indicate an engine rotational speed ne, an accelerator pedal operation amount θa, an output rotational speed of the transmission, a shift lever position of the driver, and the like, from sensors provided for various portions of the vehicle. In addition, particularly, in order to execute the control according to the present embodiment with advantage, it is applicable that a temperature sensor (not shown) is provided at a selected position of the movable portions of the throttle valve device and then the electronic control unit 50 receives the temperature value temp_th of the throttle valve device. Note that, other than the above, the electronic control unit 50 may receive various detection signals for obtaining various parameters required to execute various controls in the vehicle according to the present embodiment.

The vibration damping control device according to the present embodiment is implemented in the above electronic control unit 50. FIG. 2A is a control block diagram that shows the internal configuration of an embodiment of the electronic control unit 50.

As shown in FIG. 2A, the electronic control unit 50 may be formed of a driving control device 50, a braking control device 50b and various control devices (not shown). The driving control device 50a controls operation of the engine. The braking control device 50b controls operation of the braking system (not shown). Various control devices are equipped for the electronic control unit of any gasoline engine vehicle. Note that the configuration and operation of various control devices, such as the driving control device including the vibration damping control device, are implemented in processing operation of the CPU, or the like, in the electronic control unit 50 during operation of the vehicle.

As shown in the drawing, pulse-like electrical signals from the wheel speed sensors 30FR, 30FL, 30RR and 30RL of the wheels are input to the braking control device 50b. The pulse-like electrical signals are sequentially generated each time the wheels rotate a predetermined amount. The braking control device 50b measures the time interval between the sequentially input pulse signals to calculate the rotational speed of each wheel. Then, the rotational speed of each wheel is multiplied by the wheel radius to thereby calculate a wheel speed value r·ω. Then, in order to execute vibration damping control described in detail later, the wheel speed values r·ω is transmitted to the driving control device 50a, and is used to calculate an estimated wheel torque. Note that computation from the wheel rotational speed to the wheel speed may be performed in the driving control device 50a. In this case, the wheel rotational speed is given from the braking control device 50b to the driving control device 50a.

The driving control device 50a includes a required driving torque determination unit 51, a vibration damping control unit (compensating component computation) 52a, an intake air flow rate determination unit 53, a throttle opening degree control unit 54 and various control units 55 of any type as a basic configuration. The required driving torque determination unit 51 determines a required driving torque of the engine, required by the driver, on the basis of the accelerator pedal operation amount θa from the accelerator pedal sensor. The vibration damping control unit 52a calculates a required driving torque compensating component for executing pitch and bounce vibration damping control over the vehicle body through driving torque control to compensate (correct) a required driving torque. The intake air flow rate determination unit 53 determines a required intake air flow rate of the engine, which achieves the required driving torque on the basis of the required driving torque compensated using the compensating component calculated by the vibration damping control unit. The throttle opening degree control unit 54 controls the throttle opening degree on the basis of the required intake air flow rate. The control units 55 are used to control fuel ignition timing, and the like.

In the above basic configuration, the required driving torque determination unit 51 may be configured to determine a required driving torque on the basis of an accelerator pedal operation amount θa (and/or a request through any automatic driving control) by means of a selected method. As shown in FIG. 2A, the vibration damping control unit 52a receives the required driving torque (before compensation) determined by the required driving torque determination unit 51 and an estimated wheel torque that is estimated from the wheel speed r·ω by a wheel torque estimator 52c and that is actually acting on the wheels, calculates a compensating component that reduces or cancels a vibration component of the required driving torque (before compensation), which may cause the pitch and bounce vibration of the vehicle body, and a vibration component of the estimated wheel torque, which may cause the pitch and bounce vibration of the vehicle body (disturbance vibration component in the wheel torque), and then the calculated compensating component is superimposed on the required driving torque (before compensation) in the adder a1. Note that, although not shown in the drawing, the vibration damping control unit may be configured to further calculate a compensating component for damping the pitch and bounce vibration caused by a variation in wheel torque of each wheel through driver's brake operation or steering operation. In such a case, the vibration damping control unit receives the estimated wheel torque that is estimated on the basis of a brake operation amount or a steering operation amount and then calculates a compensating component. A specific example of a method of calculating an estimated wheel torque and a method of calculating a compensating component will be described in detail later.

The intake air flow rate determination unit 53, the throttle opening degree control unit 54 and the ignition timing control unit and the like 55 may execute driving control of a gasoline engine of any type that achieves a required driving torque using driving power of the gasoline engine. In short, in the intake air flow rate determination unit 53, the engine rotational speed ne at that time is referred to, a target intake air flow rate that achieves a required driving torque in the engine is determined using a map that is empirically or theoretically defined in advance, after that, a fuel injection amount (not shown) and an ignition timing are determined from a map of the engine rotational speed and the determined target intake air flow rate, and then control commands (not shown) are transmitted to the corresponding controllers. In controlling the intake air flow rate, a required intake air flow rate is transmitted to the throttle opening degree control unit 54, and a required throttle opening degree corresponding to the required intake air flow rate is determined. Then, the required throttle opening degree is compared with an actual opening degree (actual throttle opening degree) from the throttle position sensor 46, and a control command for specifying current to be supplied to the motor is transmitted to the current controller 22*e* in order to drive the motor so that both the required throttle opening degree and the actual throttle opening degree coincide with each other. According to intake air flow rate control by means of regulating the throttle opening degree, the driving power of the engine, that is, the output torque× rotational speed of the engine, is increased or reduced; however, the engine rotational speed is mechanically restricted by a vehicle speed and is not varied instantaneously. Thus, the throttle opening degree is set in accordance with a required intake air flow rate determined by referring to the engine rotational speed to thereby control the driving torque of the engine.

Furthermore, in the driving control device that incorporates the vibration damping control device according to the present embodiment, in addition to the above basic configuration, a control gain regulator 52*b* is provided. The control gain regulator 52*b* calculates a wear state quantity that indicates the state of wear of the throttle valve movable portions on the basis of throttle opening degree information (angular position information of the valve body) θs from the throttle position sensor 46 and throttle temperature information temp_th from a throttle temperature sensor 49, and then regulates a control gain of a compensating component superimposed on the required driving torque (before compensation) on the basis of the wear state quantity. Thus, the control gain is regulated, so it is possible to actually vary the amplitude of a compensating component superimposed on the required driving torque (before compensation). The compensating component for vibration damping control over pitch and bounce vibration is a vibration component. Thus, when the compensating component is superimposed on the required driving torque to compensate the required driving torque, the required driving torque frequently vibrates as compared with when no vibration damping control is executed. In order to follow the vibration, the angular position of the throttle valve body vibrationally varies. As described above, a vibrational variation in the angular position of the throttle valve body facilitates wear of the surfaces of the movable portions that drive the valve body, such as the valve body shaft, gears and gear bearings, so wear may advance earlier than an assumed service life of the vehicle. Then, in the present embodiment, in order to avoid a situation that wear reaches an allowable limit before the vehicle reaches the end of service life, the wear state of the throttle valve movable portions is monitored, and then the amplitude of the compensating component of vibration damping control is reduced or operation of vibration damping control is cancelled by regulating a control gain in accordance with the degree of advance of wear. By so doing, excessive advance of wear of the throttle valve movable portions is tried to be avoided. Note that, as will be described in detail later, when vibration damping control uses driving power control other than intake air flow rate control over the throttle valve (second driving power control), a control configuration for executing the second driving power control is provided instead of the control gain regulator 52*b* shown in FIG. 2A.

Operation of Device

Hereinafter, the detailed configuration and the operation thereof will be described.

(i) Pitch and Bounce Vibration Damping Control

A compensating component for pitch and bounce vibration damping control may be calculated in the vibration damping control unit 52*a* shown in FIG. 2A as follows.

Principle of Vibration Damping Control

Figure 3A:
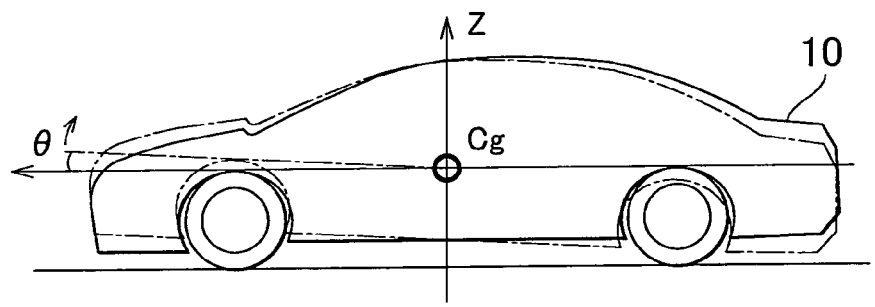
FIG. 3A is a view that illustrates a state variable of vehicle body vibration that is suppressed by operation of the vibration damping control unit of a driving control device according to the embodiment of the invention.

In the vehicle 10 illustrated in FIG. 3A, the driving device operates on the basis of a driver's driving request to cause the wheel torque to fluctuate, or when an external force or torque (disturbance) acts on the wheels from a road surface during running of the vehicle and then the disturbance is transmitted to the vehicle, bounce vibration in the vertical direction (z direction) of the center of gravity Cg of the vehicle body and pitch vibration in the pitch direction (θ) direction around the center of gravity of the vehicle body may occur. Then, in the pitch and bounce vibration damping control illustrated here, the movement model of pitch and bounce vibration of the vehicle body is constructed, then displacements z and θ of the vehicle body and the rates of change dz/dt and dθ/dt, that is, the state variables of vehicle body vibration, when a required driving torque (value converted from the required driving torque into a wheel torque) or a current wheel torque (estimated current wheel torque) are input in the model are calculated, and then the driving torque of the driving device (engine) is regulated (required driving torque is regulated) so that the state variables obtained from the model converge to 0, that is, pitch and bounce vibration is suppressed.

Figure 3B:
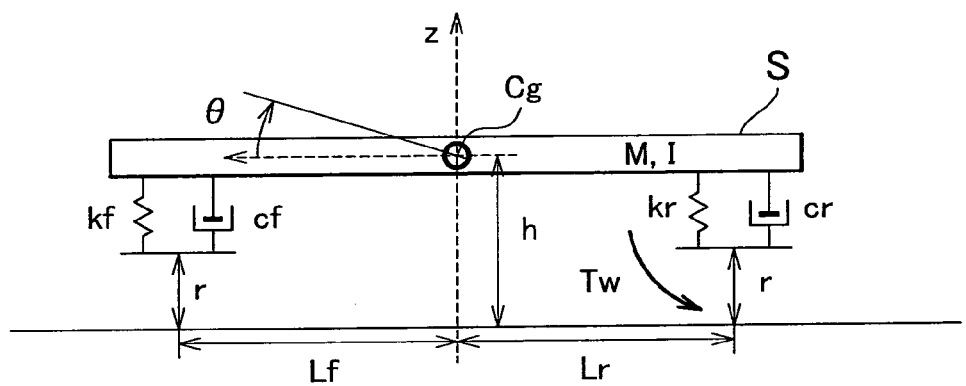
FIG. 3B is a view that illustrates a "sprung mass vibration model" that is one of mechanical movement models of vehicle body vibration and that is assumed in the vibration damping control unit according to the embodiment of the invention.

FIG. 3B, for example, shows a mechanical movement model of the vehicle body in the bounce direction and pitch direction in vibration damping control. As shown in FIG. 3B, the vehicle body is considered as a rigid body S having a mass M and moment of inertia I, and it is assumed that the rigid body S is supported by a front wheel suspension having an elastic modulus kf and a damping factor cf and a rear wheel suspension having an elastic modulus kr and a damping factor cr (sprung mass vibration model of the vehicle body). In this case, equation of motion of the center of gravity of the vehicle body in the bounce direction and equation of motion in the pitch direction are expressed by the following mathematical expressions (1a) and (1b).

$$M\frac{d^2z}{dt^2} = -kf(z + Lf \cdot \theta) - cf\left(\frac{dz}{dt} + Lf \cdot \frac{d\theta}{dt}\right) - kr(z - Lr \cdot \theta) - cr\left(\frac{dz}{dt} - Lr \cdot \frac{d\theta}{dt}\right) \tag{1a}$$

$$I\frac{d^2\theta}{dt^2} = -Lf\left\{kf(z + Lf \cdot \theta) - cf\left(\frac{dz}{dt} + Lf \cdot \frac{d\theta}{dt}\right)\right\} + Lr\left\{kr(z - Lr \cdot \theta) + cr\left(\frac{dz}{dt} - Lr \cdot \frac{d\theta}{dt}\right)\right\}\frac{h}{r} \cdot T \tag{1b}$$

Here, Lf and Lr are respectively distances from the center of gravity to a front wheel axle and a rear wheel axle, r is a wheel radius, and h is the height of the center of gravity from the road surface. Note that, in the mathematical expression (1a), the first and second terms are components of force from the front wheel axle and the third and fourth terms are components of force from the rear wheel axle, and, in the mathematical expression (1b), the first term is a component of moment of force from the front wheel axle and the second term is a component of moment of force from the rear wheel axle. The third term in the mathematical expression (1b) is a component of moment of force that a wheel torque T generated in the driving wheels is applied around the center of gravity of the vehicle body.

The above mathematical expressions (1a) and (1b) may be rewritten to the form of state equation (of a linear system) as shown in the following mathematical expression (2a) by forming displacements z and θ of the vehicle body and their rates of change dz/dt and dθ/dt into a state variable vector X(t).

$$dX(t)/dt = A \cdot X(t) + B \cdot u(t) \quad (2a)$$

Here, X(t), A and B are respectively as follows.

$$X(t) = \begin{pmatrix} z \\ \frac{dz}{dt} \\ \theta \\ \frac{d\theta}{dt} \end{pmatrix}, A = \begin{pmatrix} 0 & 1 & 0 & 0 \\ a1 & a2 & a3 & a4 \\ 0 & 0 & 0 & 1 \\ b1 & b2 & b3 & b4 \end{pmatrix}, B = \begin{pmatrix} 0 \\ 0 \\ 0 \\ p1 \end{pmatrix}$$

Elements a1 to a4 and b1 to b4 of the matrix A are given by putting the coefficients of z, θ, dz/dt and dθ/dt of the mathematical expressions (1a) and (1b) together, and a1=−(kf+kr)/M, a2=−(cf+cr)/M, a3=−(kf·Lf−kr·Lr)/M, a4=−(cf·Lf−cr·Lr)/M, b1=−(Lf·kf−Lr·kr)/I, b2=−(Lf·cf−Lr·cr)/I, b3=−(Lf²·kf+Lr²·kr)/I and b4=−(Lf²·cf+Lr²·cr)/I. In addition, u(t) is T, and is an input of the system expressed by state equation (2a). Thus, from the mathematical expression (1b), the element p1 of the matrix B is h/(I·r).

In the state equation (2a), if the following relationship is set, $$u(t) = -K \cdot X(t) \quad (2b)$$

the state equation (2a) may be rewritten as follows.

$$dX(t)/dt = (A - BK) \cdot X(t) \quad (2c)$$

Thus, when the differential equation (2c) of the state variable vector X(t) is solved while the initial value X₀(t) of X(t) is set so that X₀(t)=(0, 0, 0, 0) (it is assumed that no vibration occurs before torque is input.), if a gain K for converging X(t), that is, displacements in the bounce direction and pitch direction and the time rates of change, to 0 is determined, a torque value u(t) that suppresses pitch and bounce vibration is determined. A value that is obtained by converting the torque value u(t) to an engine driving torque is a compensating component in vibration damping control.

The gain K may be determined using a so-called optimal regulator theory. According to the above theory, it is known that, when the value of the following quadratic evaluation function is minimal, $$J = \tfrac{1}{2} \int (X^T Q X + u^T R u) dt \quad (3a) \text{ (integral range is 0 to } \infty\text{)}$$

X(t) stably converges in the state equation (2a), and the matrix K that minimizes the evaluation function J is given by K=R⁻¹·Bᵀ·P. Here, P is a solution of Riccati equation −dP/dt=AᵀP+PA+Q−PBR⁻¹BᵀP. Riccati equation may be solved by any method known in the field of linear system. By so doing, the gain K is determined.

Q and R in the above evaluation function J and the Riccati equation are respectively selected positive semidefinite symmetric matrix and positive definite symmetric matrix, and are weighting matrices of the evaluation function J determined by the designer of the system. For example, in the case of the movement model assumed here, Q and R are set as follows.

$$Q = \begin{pmatrix} q1 & 0 & 0 & 0 \\ 0 & q2 & 0 & 0 \\ 0 & 0 & q3 & 0 \\ 0 & 0 & 0 & q4 \end{pmatrix}, R = (\rho)$$

In the mathematical expression (3a), when the norms of specified ones, such as dz/dt and dθ/dt, among the elements of the state vector are set to be larger than the norms of the other elements, such as z and θ, the elements for which the large norms are set relatively further stably converge. In addition, when the values q1 to q4 of the elements of Q are increased, transitional characteristic-oriented, that is, the value of the state vector quickly converges to a stable value; whereas, when the value p of R is increased, consumption energy is reduced.

Figure 3C:
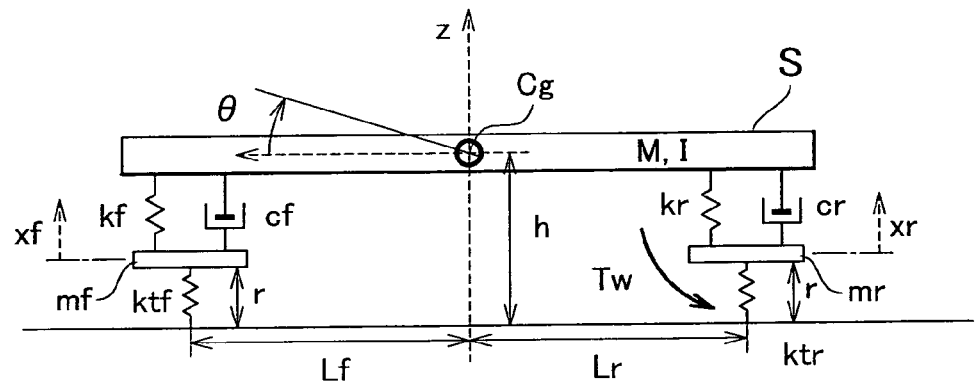
FIG. 3C is a view that illustrates a sprung and unsprung mass vibration model.

Note that, for example, a model that takes the spring elasticity of tires of the front and rear wheels into consideration (sprung and unsprung mass vibration model of the vehicle body) as shown in FIG. 3C may be employed as the mechanical movement model of the vehicle body in the bounce direction and pitch direction in addition to the configuration shown in FIG. 3B. If the tires of the front and rear wheels respectively have elastic moduli ktf and ktr, as is understood from FIG. 3C, equation of motion of the center of gravity of the vehicle body in the bounce direction and equation of motion in the pitch direction are expressed by the following mathematical expressions (4a) to (4d).

$$M \frac{d^2 z}{dt^2} = -kf(z + Lf \cdot \theta - xf) - cf\left(\frac{dz}{dt} + Lf \cdot \frac{d\theta}{dt} - \frac{dxf}{dt}\right) - \quad (4a)$$
$$kr(z - Lr \cdot \theta - xr) - cr\left(\frac{dz}{dt} - Lr \cdot \frac{d\theta}{dt} - \frac{dxr}{dt}\right)$$

$$I \frac{d^2 \theta}{dt^2} = -Lf\left\{kf(z + Lf \cdot \theta - xf) - cf\left(\frac{dz}{dt} + Lf \cdot \frac{d\theta}{dt} - \frac{dxf}{dt}\right)\right\} + \quad (4b)$$
$$Lr\left\{kr(z - Lr \cdot \theta - xr) + cr\left(\frac{dz}{dt} - Lr \cdot \frac{d\theta}{dt} - \frac{dxr}{dt}\right)\right\} + \frac{h}{r} \cdot T$$

$$mf \frac{d^2 xf}{dt^2} = kf(z + Lf \cdot \theta - xf) + cf\left(\frac{dz}{dt} + Lf \cdot \frac{d\theta}{dt} - \frac{dxf}{dt}\right) + ktf \cdot xf \quad (4c)$$

$$mr \frac{d^2 xr}{dt^2} = kr(z - Lr \cdot \theta - xr) + cr\left(\frac{dz}{dt} - Lr \cdot \frac{d\theta}{dt} - \frac{dxr}{dt}\right) + ktr \cdot xr \quad (4d)$$

Here, xf and xr are unsprung displacements of the front and rear wheels, and mf and mr are unsprung masses of the front and rear wheels. The mathematical expressions (4a) and (4b) use z, θ, xf, xr and the time differential value as a state variable vector to form the state equation like the mathematical expression (2a) as in the case of FIG. 3B (where matrix A is 8 rows by 8 columns and matrix B is 8 rows by 1 column), and are able to determine a gain matrix K that converges the norm of the state variable vector to 0 in accordance with the optimal regulator theory.

Configuration of Vibration Damping Control Unit

Figure 2B:
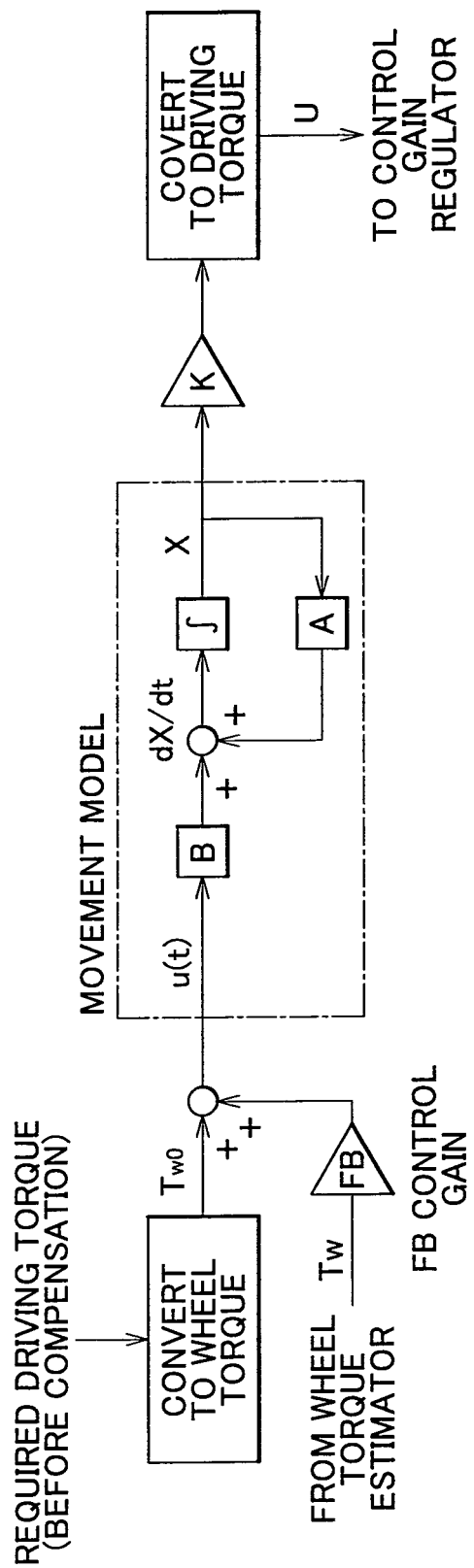
FIG. 2B is a control block diagram of the configuration of a vibration damping control unit according to the embodiment of the invention.

The control configuration of the vibration damping control unit 52a that calculates a compensating component U for the pitch and bounce vibration damping control is shown in FIG. 2B. As shown in the drawing, in the vibration damping control unit 52a, a wheel torque Two converted from the required driving torque, transmitted from the required driving torque determination unit 51, to a wheel torque and an (estimated) wheel torque Tw that is actually generated in the wheels and that is estimated from the wheel speed in the wheel torque estimator 52c are input to the movement model, and, in the movement model, the torque input value Two+Tw is used to solve the differential equation (2a) to thereby calculate the state variable vector X(t). Subsequently, a value u(t) obtained by multiplying the state variable vector X(t) by the gain K, which is determined to converge the state variable vector X(t) to 0 or a minimum value, is calculated, and the u(t) is converted to a compensating component U(t) on an engine driving torque basis and is then transmitted to the adder a1 (via the control gain regulator). Then, in the adder a1, the compensating component U(t) is subtracted from the required driving torque. As is understood from the mathematical expressions (1a) and (1b), the pitch and bounce vibration system of the vehicle body is a resonant system, and the value of the state variable vector against an arbitrary input substantially has only a frequency component in a band that has a certain spectrum characteristic and that has a center substantially at the natural frequency (about 1 to 5 Hz) of the system. In this way, when U(t) is subtracted from the required driving torque, a component of the system having a natural frequency, that is, a component that causes pitch and bounce vibration in the vehicle body, is reduced or removed from the required driving torque, and a pitch and bounce vibration component caused by a wheel torque disturbance is substantially cancelled or reduced to thereby suppress the pitch and bounce vibration in the vehicle body.

Wheel Torque Estimation

Ideally, the wheel torque that is input to the above movement model and that is actually generated in each wheel is actually detected with a torque sensor provided for each wheel; however, it is difficult to provide a torque sensor for each wheel of an ordinary vehicle. Then, in the example shown in the drawing, an estimated wheel torque that is estimated in the wheel torque estimator 52c (FIG. 2A) from another detectable value in the vehicle during running is used as a disturbance input of the wheel torque. The estimated wheel torque Tw may be typically estimated as follows using the time differential of the wheel speed r·ω or wheel rotational speed ω obtained from the wheel speed sensor of each driving wheel.

$$Tw = M \cdot r^2 \cdot d\omega/dt \quad (5)$$

Here, M is the mass of the vehicle, and r is a wheel radius. If the sum of driving forces generated at the contact portions at which the driving wheels contact a road surface is equal to the overall driving force M·G of the vehicle (G is acceleration), the wheel torque Tw is given by the following mathematical expression.

$$Tw = M \cdot G \cdot r \quad (5a)$$

The acceleration G of the vehicle is given from the differential value of the wheel speed r·ω as follows.

$$G = r \cdot d\omega/dt \quad (5b)$$

Therefore, the wheel torque is estimated as expressed by the mathematical expression (5).

Note that the estimated wheel torque may be estimated not from a wheel speed but from an engine rotational speed or a transmission rotational speed, and the aspect of the invention also encompasses this case.

(ii) Configuration for Managing Wear of Throttle Valve Movable Portions (Control Gain Regulator 52b, Etc.)

As is already described above, the control device according to the present embodiment includes the control gain regulator 52b. The control gain regulator 52b is used to regulate the control gain of the compensating component that is output from the vibration damping control unit in order to manage wear of the throttle valve movable portions so as to avoid excessive advance of the wear within the change of characteristic of the throttle valve. In the control gain regulator 52b, an index value (wear state quantity) that indicates the degree of advance of wear of the throttle valve movable portions is sequentially calculated on the basis of the throttle opening degree (angular position of the valve body) and the throttle temperature, the degree of advance or state of wear of the throttle valve movable portions is monitored substantially in real time during running of the vehicle, and then the control gain of the compensating component is reduced (including the gain is set to 0 to stop vibration damping control) through vibration damping control in correspondence with the wear state quantity so that the wear state quantity falls within a predetermined range during usage of the vehicle.

The "wear state quantity" may be any quantity as long as it indicates the state of wear of the throttle valve movable portions. According to the research and development of the inventors, and the like, of the invention, it has been found that the advance of wear is earlier in the gear teeth of the gears that drive the valve body 40 and the gear bearings than in the other portions among the throttle valve movable portions, so, in the present embodiment, the wear amount of the surfaces of the gear teeth or gear bearings, that is, the dimensions (thickness) of the amount of substance removed because of wear with respect to the designed value, are employed as the "wear state quantity". The wear amount of the surfaces of the gear teeth or gear bearings is a "wear rate", that is, an accumulated value of the wear amount per predetermined unit time from the start of usage of the throttle valve, and the "wear rate" has the following characteristic. (a) As the displacement of the valve body per predetermined unit time increases, or as the frequency and amplitude of the valve body displacement (frequency and amplitude of the throttle opening degree) each increase, the wear rate increases. (b) As the temperature of the throttle valve movable portions increases, the wear rate increases. (c) As wear advances, that is, as the wear amount increases, the wear rate reduces. (d) As the valve body position is distanced from the opening degree center position, the wear rate increases (see FIG. 1D). In this way, in estimating the wear amount of the present embodiment, the characteristic of the wear rate is considered. Hereinafter, estimating the wear amount and changing the control mode in accordance with the estimated wear amount will be described.

First Estimation of Wear Amount

Figure 4A:
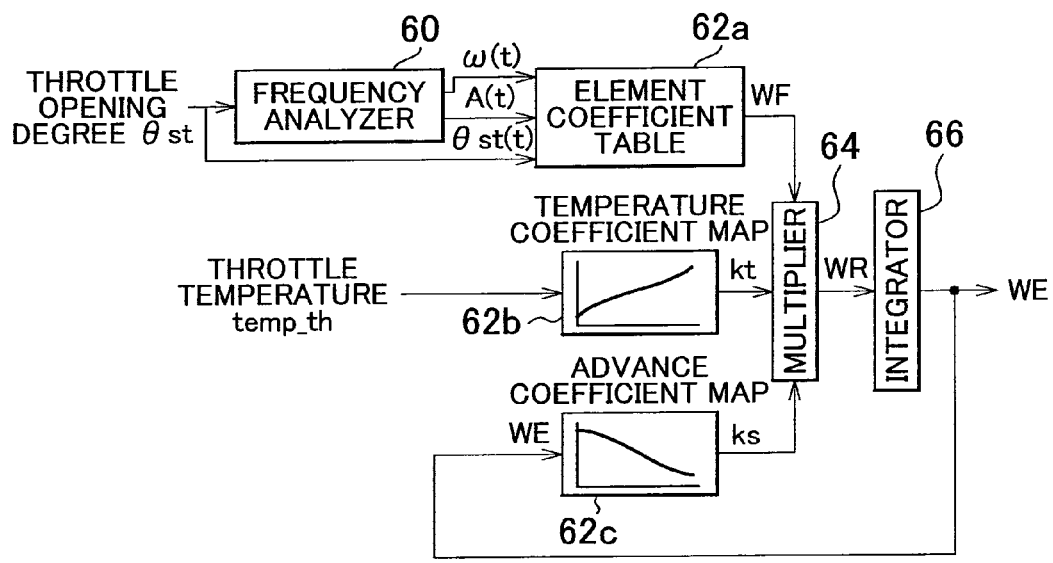
FIG. 4A and FIG. 4B are control block diagrams that respectively show first and second embodiments of the configuration for calculating a wear amount WE of a control gain regulator.

In one embodiment of estimating the wear amount, as shown in the control block diagram shown in FIG. 4A, in the control gain regulator 52b according to the present embodiment, the wear rate WR and the wear amount WE are sequentially calculated from the start of usage of the vehicle or the throttle valve using the following mathematical expression by referring to the throttle opening degree θst and the throttle temperature temp_th.

$$WE = \Sigma WR \quad (6a)$$

$$WR = kt \times ks \times WF \quad (6b)$$

In the above mathematical expression (6a), Σ indicates an accumulation of the wear rate WR from the start of usage of the throttle valve, and this computing process is executed by an integrator indicated by the reference numeral 66 in FIG. 4A. In this case, the wear rate WR is a wear amount per processing cycle time (predetermined unit time) during which one value of the wear rate WR is calculated. In addition, in the mathematical expression (6b), WF, ks and kt are respectively wear coefficient, advance coefficient and temperature coefficient.

The wear coefficient WF is a wear rate at a selected standard temperature at the start of usage of the throttle valve, that is, at the time when the dimensions of the gear teeth and gear bearings coincide with the designed values. The wear coefficient WF may be sequentially given from an element coefficient table 62a that uses the frequency ω(t) and amplitude A(t) of the throttle opening degree θst, determined by sequentially analyzing the frequency of the throttle opening degree θst using a frequency analyzer 60, and the throttle opening degree θst(t) as parameters. The element coefficient table 62a stores a group of wear rates in selected combinations of the frequency ω, amplitude A and throttle opening degree θst that fall within assumed ranges during running of the vehicle. The group of wear rates are data that are empirically obtained through a wear test under the condition of various combinations of the frequency ω, amplitude A and throttle opening degree θst using a device of the same type as the throttle valve used in the vehicle. The wear coefficient WF is output in response to an input of the frequency ω(t), amplitude A(t) and opening degree θst(t). Note that, as is already described above, the wear coefficient WF given from the element coefficient table 62a increases because of an increase in displacement stroke of the valve body per predetermined unit time as the frequency ω(t) and/or the amplitude A(t) increases, and increases because of an increase in force acting on the movable portions as the throttle opening degree θst(t) is distanced from the opening degree center.

The temperature coefficient kt indicates the temperature dependency of the wear rate that is set so as to be 1 at the standard temperature, and is given by a temperature coefficient map 62b that uses the throttle temperature temp_th as a parameter. As is already described above, the temperature coefficient kt increases as the temperature increases as shown by the graph illustrated in the map 62b shown in FIG. 4A in correspondence with an increase in wear rate with an increase in temperature. The temperature coefficient given by the temperature coefficient map may also be determined on the basis of data that are empirically obtained through a wear test in advance as in the case of the wear coefficient WF.

The advance coefficient ks indicates the dependency of the wear rate on the wear amount WE, and is given by an advance coefficient map 62c that uses the wear amount WE as a parameter. As is already described above, the wear rate reduces as the wear amount WE increases, so the advance coefficient ks is set so as to reduce with an increase in wear amount WE as shown by the graph illustrated in the map 62c shown in FIG. 4A. A specific value of the advance coefficient may be determined on the basis of data that are empirically obtained through a wear test in advance as in the case of the above two coefficients.

In operation, during running of the vehicle, the frequency ω(t) and amplitude A(t) of the throttle opening degree θst are sequentially determined by the frequency analyzer 60, and then these values and the throttle opening degree θst are used to determine the wear coefficient WF in the element coefficient table 62a. After that, in a multiplier 64, the wear coefficient WF, the temperature coefficient kt and the advance coefficient ks are multiplied by one another in accordance with the mathematical expression (6b) to calculate the wear rate WR, and then the wear rate WR is accumulated in the integrator 66 to calculate the wear amount WE. The wear amount WE is an accumulated value of the wear rate WR from the start of usage of the throttle valve, so the control gain regulator 52b includes a nonvolatile storage device that stores the wear amount WE even when a start button or ignition switch of the vehicle is turned off.

Second Estimation of Wear Amount

As is already described above, the wear rate WR increases with an increase in displacement of the valve body per predetermined unit time, so, as another embodiment for estimating the wear amount, the wear rate WR may be calculated from the displacement of the valve body per predetermined unit time. In this case, for example, as shown by the control unit block diagram in FIG. 4B, a memory 62e that stores a throttle opening degree θst(n−1) that is performed a predetermined unit time (typically, one control cycle time) before, an adder 62f and an absolute value operator 62g are prepared, and these are used to calculate the absolute value |Δθ| of a variation in opening degree in a predetermined unit time from a current opening degree θst(n) and an opening degree θst(n−1) that is performed the predetermined unit time before as follows.

$$|\Delta\theta|=|\theta st(n)-\theta st(n-1)| \quad (7a)$$

Then, the wear rate WR may be given as follows.

$$WR=kt \cdot kp \cdot \alpha \cdot |\Delta\theta| \quad (7b)$$

Here, kt is a temperature coefficient that indicates the temperature dependency of the wear rate calculated by a temperature coefficient calculator 62b, and may be empirically or theoretically set so as to increase with an increase in temperature using the throttle temperature temp_th as a parameter, as in the case of the example of FIG. 4A. In addition, kp is a position coefficient that indicates the opening degree dependency of the wear rate calculated from a current throttle opening degree θst by a position coefficient calculator 62d, and may be empirically or theoretically set so that the wear rate reflects the fact that force acting on the throttle valve movable portions increases to facilitate the advance of wear as the opening degree is distanced from the opening degree center position. Then, α is a conversion coefficient for converting a variation in opening degree to a wear rate. Note that, in the mathematical expression (7b), the order of the absolute value |Δθ| of the variation with respect to the wear rate WR is 1 (first order proportion); however, it should be understood that the order of |Δθ| may be other than 1 depending on the material and configuration of the throttle valve movable portions. It is important that the wear rate WR monotonously increases with an increase in |Δθ|. In addition, although not shown in the drawing, in the configuration of FIG. 4B as well, the dependency of wear rate on the wear amount WE (advance coefficient ks) may be considered as in the case of FIG. 4A. In this way, the calculated wear rate WR is accumulated by the integrator 66 to thereby calculate the wear amount WE as in the case of FIG. 4A.

Figure 4B:
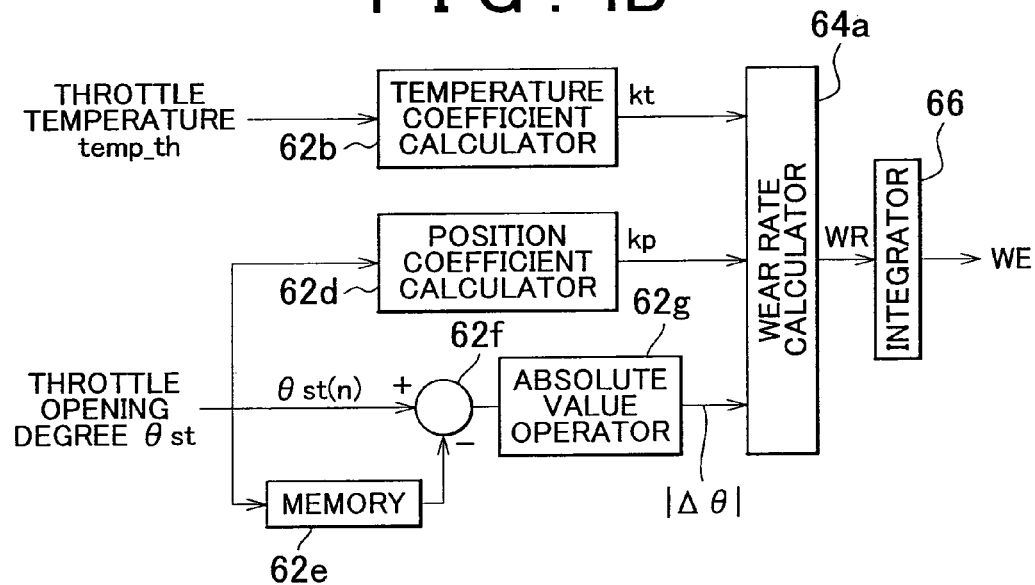

Third Estimation of Wear Amount—Estimation of Wear Amount Due to Vibration Damping Control Compensating Component In the configuration of estimating the wear amount, shown in FIG. 4A and FIG. 4B, the wear amount is calculated without considering whether wear developed in the throttle valve movable portions is due to vibration damping control. However, in managing the advance of wear of the throttle valve movable portions, when it is possible to separately monitor wear due to vibration damping control and wear due to a factor other than vibration damping control (including wear due to normal operation of the throttle valve), it is advantageous in monitoring of a change of state of the vehicle or maintenance of the vehicle. For example, when wear of the throttle valve movable portions has advanced to some degree, it is determined whether to continue vibration damping control by determining whether the advance of wear is due to vibration damping control, or a predetermined allowable wear amount due to vibration damping control is preset, and, when the wear amount due to vibration damping control has reached the predetermined wear amount, vibration damping control is stopped or the function and advantageous effect of vibration damping control are reduced. By so doing, it is possible to use the throttle valve for an extended long period of time. Then, in the present embodiment, the wear amount due to vibration damping control may be calculated.

Figure 5A:
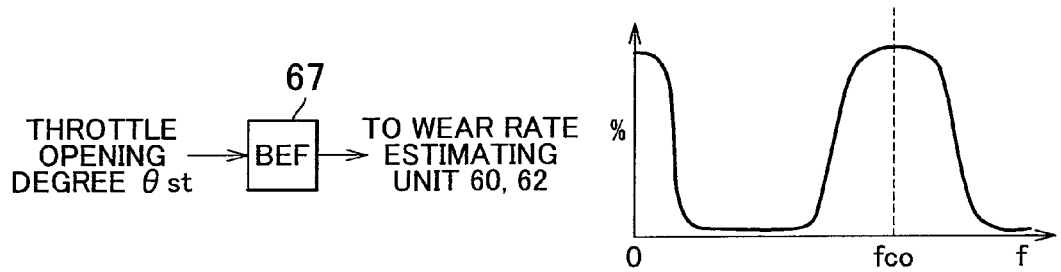
FIG. 5A to FIG. 5C are control block diagrams of some examples of the configuration for calculating a wear amount WEx due to a compensating component of the vibration damping control device according to the embodiment of the invention.

One embodiment of estimation of the wear amount due to vibration damping control may be, for example, configured to input only a vibration component, corresponding to a compensating component extracted from the throttle opening degree θst using a band elimination filter (BEF) 67 as illustrated in FIG. 5A, into various portions (60 to 66) that calculate an estimated wear amount as illustrated in FIG. 4A or FIG. 4B. In terms of this point, as is already described above, the wear rate increases as the valve body position is distanced from the opening degree center position, so the degree of advance of wear varies depending on the position of the valve body, at which valve body vibration corresponding to the compensating component occurs. Then, the BEF 67 is regulated to have a frequency transmission characteristic that substantially transmits a component in a band close to a frequency (generally, natural frequency of vehicle body vibration) fco of a compensating component as shown in the right-hand view of FIG. 5A and a component in a low-frequency band close to direct current so that the output signal of the BEF 67 is a signal when vibration of the angular position due to the compensating component is further superimposed in a state where the valve body is moved to the angular position corresponding to an accelerator pedal operation amount, or the like, that is, the output signal of the BEF 67 becomes a component that is obtained by adding a vibration component based on the compensating component in the variation of the throttle opening degree to the variation of the vibration center position of the vibration component. The angular position corresponding to an accelerator pedal operation amount, or the like, is reflected on the component in the low-frequency band close to direct current. Then, the output signal of the BEF 67 is input to the configuration shown in FIG. 4A or FIG. 4B to thereby calculate the wear rate WR and the wear amount WEx substantially due to vibration damping control.

Figure 5B:
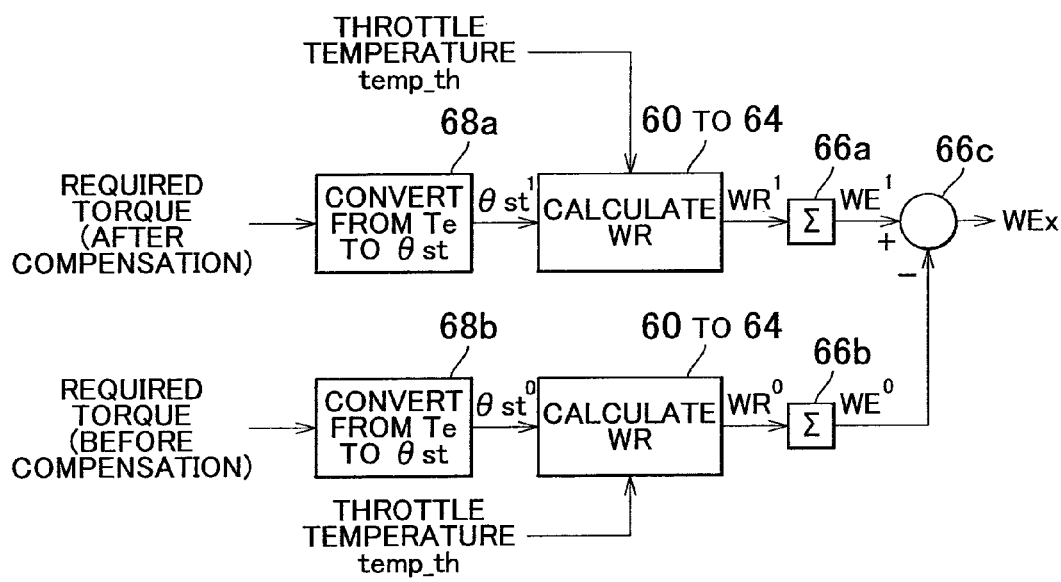

In addition, as another embodiment, the wear amount due to vibration damping control may be obtained by subtracting the wear amount estimated for the throttle valve movable portions on the assumption that no vibration damping control is executed from the total wear amount estimated for the throttle valve movable portions. In this case, for example, as illustrated in FIG. 5B, a total wear amount $WE^1$ may be obtained in such a manner that a current throttle opening degree θst or a value $θst^1$ obtained by converting a required driving torque compensated by a compensating component to a throttle opening degree by a converter 68a is input to a wear rate calculator 60 to 64, which may be the same as that of FIG. 4A or FIG. 4B, to calculate a wear rate $WR^1$ and then the wear rate $WR^1$ is accumulated by an integrator 66a. In addition, the wear rate $WE^0$ estimated on the assumption that no vibration damping control is executed may be obtained in such a manner that a value $θst^0$ obtained by converting a required driving torque before being compensated by a compensating component (value before being input to the adder a1) to a throttle opening degree by a converter 68b or a value obtained by removing the amount of throttle opening degree corresponding to the compensating component from a current throttle opening degree θst is input to the wear rate calculator 60 to 64, which may be the same as that of FIG. 4A or FIG. 4B, to calculate a wear rate $WR^0$ and then the wear rate $WR^0$ is accumulated by an integrator 66b. Then, the wear amount WEx due to vibration damping control is given in an adder 66c using the following mathematical expression.

$$WEx = WE^1 - WE^0 \qquad (8)$$

Figure 5C:
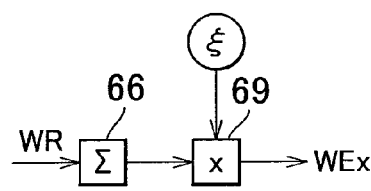

Note that, in the vehicle, when the ratio of the wear amount due to vibration damping control to the total wear amount estimated for the throttle valve movable portions may be empirically or statistically determined, a value obtained by multiplying a coefficient ξ (in a multiplier 69) by the wear amount WE calculated by the configuration of FIG. 4A or FIG. 4B may be employed as the wear amount WEx due to vibration damping control, as illustrated in FIG. 5C. In addition, when the wear amount WEx due to vibration damping control is calculated by the configuration of FIG. 5A to FIG. 5C as well, the total wear amount WE (wear amount obtained by directly inputting the throttle opening degree to the configuration shown in FIG. 4A or FIG. 4B) may be separately calculated.

Stopping Control or Reducing Function of Control on the Basis of Wear Amount

As described above, when the wear amount WE (which may also be a wear amount WEx due to vibration damping control, and the same applies to the following description) is determined, for example, changing a control mode, such as reducing the function of a compensating component or stopping vibration damping control, may be carried out in accordance with the magnitude of the wear amount WE in order to avoid excessive advance of wear.

Figure 6A:
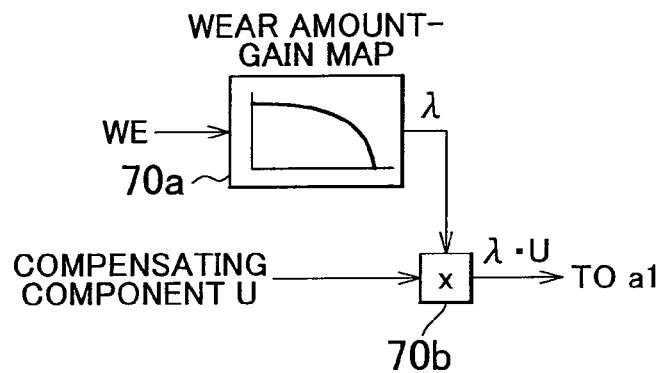

For example, as one embodiment, as illustrated in FIG. 6A, a control gain λ of the compensating component is determined on the basis of the wear amount WE by referring to a wear amount—gain map 70a, the control gain λ is multiplied by the compensating component U in the multiplier 70b, and then the resultant value is transmitted to the adder a1 of FIG. 2A. The value of the gain for the wear amount (profile of the map) may be selected by the designer so as to achieve the main subject of the device according to the aspect of the invention, that is, so as to effectively use vibration damping control as much as possible while ensuring that the throttle valve normally operates until it reaches the end of the service life of the vehicle. As one embodiment, for example, the wear amount WE may approach a predetermined allowable value, and the control gain λ may be gradually reduced. Alternatively, it is also applicable that, before the wear amount WE reaches a predetermined value that is smaller than the predetermined allowable value, the control gain λ is kept constant, and the control gain λ is reduced to be substantially 0 by the time when the wear amount WE exceeds the predetermined value and then reaches the allowable value.

Figure 6B:
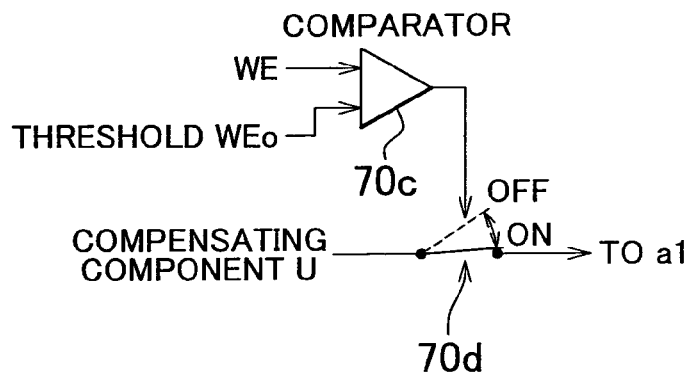

In addition, as another embodiment, the control gain may be set to 0 when the wear amount WE has reached the predetermined allowable value, or, as illustrated in FIG. 6B, when the wear amount WE and its threshold WEo are input to a comparator 70c and then it holds that wear amount WE>threshold WEo, a switch 70d may shut off transmission of the compensating component to the adder a1 (may switch from on to off). In any case, when the wear amount WE reaches the allowable value or threshold, fluctuations of the valve body are stopped by executing vibration damping control (fluctuations of the valve body in response to a driver's accelerator pedal operation amount are allowed). By so doing, the advance of wear due to vibration damping control is stopped. Note that the allowable value or threshold of the wear amount is typically set so that the valve body is normally movable in response to a driver's accelerator pedal operation amount after the wear amount has reached the allowable value or the threshold. In addition, the threshold WEo may be different between when the total wear amount WE is used as a reference wear amount and when the wear amount WEx due to vibration damping control is used as a reference wear amount.

Figure 6C:
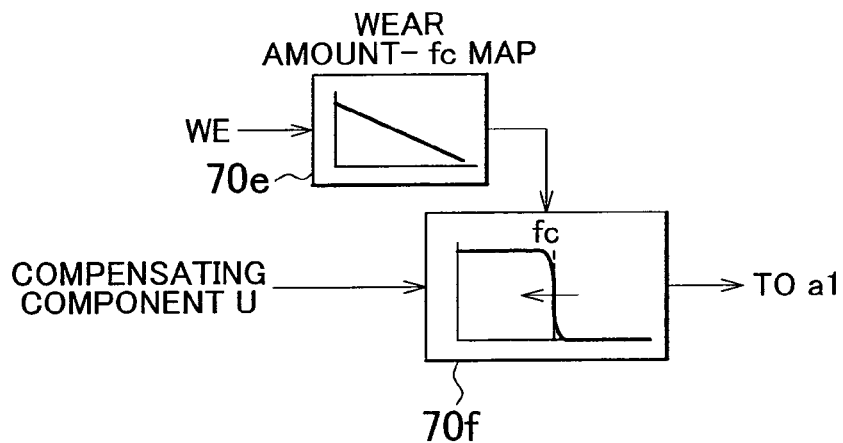

Furthermore, as a further other embodiment, as illustrated in FIG. 6C, it is also applicable that, when a low-pass filter 70f is provided to cut off a component, including a noise, in an excessively high-frequency band when the compensating component U is transmitted to the adder a1, the cut-off frequency fc of the low-pass filter 70f is changed in response to the magnitude of the wear amount WE to thereby regulate the amplitude of the compensating component U. In the low-pass filter 70f, typically, a signal higher than or equal to the cut-off frequency fc is not completely cut off, but the transmission signal intensity gradually reduces near a frequency around the cut-off frequency fc as schematically shown in the low-pass filter 70f in the drawing. Thus, the above characteristic is used to change the cut-off frequency fc as a function of the magnitude of the wear amount WE. By so doing, it is possible to regulate the intensity of the transmission signal. In this case, typically, it is applicable that a map 70e for determining the cut-off frequency fc is provided using the wear amount WE as a parameter, and the value of the cut-off frequency fc is issued to the low-pass filter 70f from the map. In the map 70e, as the wear amount WE increases or when the wear amount WE exceeds a predetermined threshold, the cut-off frequency fc may be reduced to reduce the intensity of the compensating component that is transmitted through the low-pass filter 70f.

Vibration Damping Control Executed by Alternative Means

As described above, when the wear amount increases, vibration damping control through driving power control, which requires vibrational fluctuations of the throttle valve, should not be executed as much as possible in order to avoid or suppress further advance of wear of the throttle valve movable portions. However, if it is possible to vibrationally fluctuate driving power without requiring vibrational fluctuations of the throttle valve, it is possible to execute vibration damping control through driving power control even under the condition that further advance of wear should be avoided or suppressed. In terms of this point, as is known by a person skilled in the art, driving power of the engine may be vibrationally regulated through engine ignition angle control, intake valve lift control, alternator operation control and another control. Then, in the present embodiment, when the wear amount increases or exceeds a predetermined threshold, it is also applicable that control other than intake air flow rate control over the throttle valve is used to vary driving power in response to the compensating component of vibration damping control as described above to thereby make it possible to continue vibration damping control.

Figure 6D:
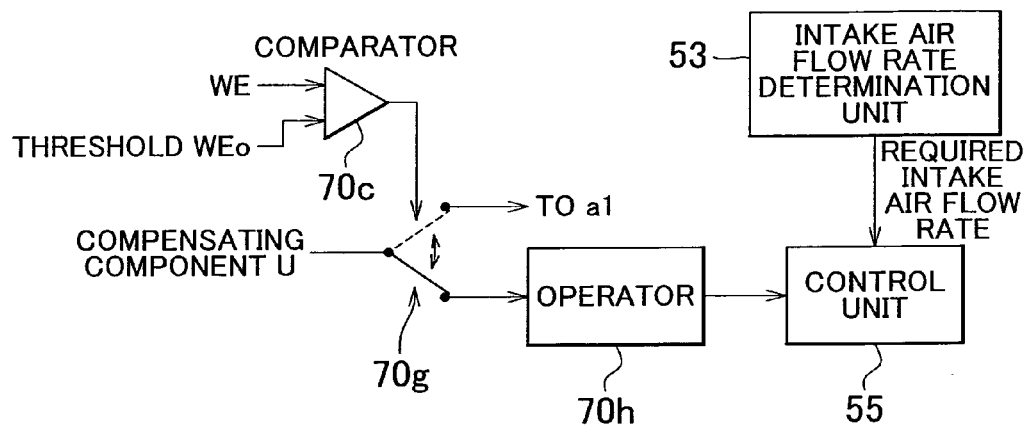

Specifically, in the device according to the present embodiment, instead of the control gain regulator 52b, as illustrated in FIG. 6D, a switch 70g may be provided to switch a transmission destination of the compensating component U from the adder a1 to an operator 70h that computes a control correction amount of a control other than intake air flow rate control of the throttle valve when the wear amount WE exceeds a predetermined threshold WEo. When the operator 70h receives the compensating component U, the operator 70h calculates a control correction amount and then transmits the control correction amount to a selected control unit 55 so as to achieve driving torque fluctuations corresponding to the compensating component U in the selected control unit 55. For example, when engine ignition angle control is selected as a control other than intake air flow rate control of the throttle valve, it is applicable that the operator 70h determines a retard correction amount of ignition angle for achieving the vibration of the compensating component U through any method (typically, using a prepared map) and then transmits the retard correction amount to an ignition timing control unit 55. When the ignition timing control unit 55 receives a retard correction amount, the ignition timing control unit 55 refers to the retard correction amount and a required intake air flow rate corresponding to a required driving torque on which no compensating component is superimposed, determines an ignition timing through any method so as to achieve a torque obtained by superimposing the compensating component U on the required driving torque, and then transmits a control command to an ignition plug. In addition, when intake valve lift control is selected as a control other than the intake air flow rate control of the throttle valve, it is applicable that the operator 70h determines a correction amount of the lift of an intake valve through any method so as to achieve the vibration of the compensating component U and then transmits the correction amount to a valve control unit 55. Furthermore, when alternator operation control is selected as a control other than the intake air flow rate control of the throttle valve, it is applicable that the operator 70h determines a correction amount of a control command that determines the field current of an alternator through any method so as to achieve the vibration of the compensating component U and then transmits the correction amount to a field current control device of the alternator. Note that alternative means in the above configuration may be any means, other than controls illustrated here, that is able to vary driving power.

Configuration for Monitoring and Referring to Wear Amount

It is desirable that the wear amount estimated by the configuration shown in FIG. 4A to FIG. 5C or the result of determination as to whether the wear amount exceeds a predetermined threshold may be referred to by a user, manager, mechanic, or the like, of the vehicle for the purpose of managing the degree of advance of wear of the throttle valve movable portions by those user, and the like. Then, in the present embodiment, a configuration for supplying information about a wear amount, the result of determination of the wear amount, and the like, using any service tool or display device may be provided. Specifically, in the device according to the present embodiment, as is schematically shown in the block diagram of FIG. 6E, a nonvolatile memory 100 that receives and stores a wear amount WE and/or WEx estimated in FIG. 4A and FIG. 4B or FIG. 5A to FIG. 5C may be provided. Note that the nonvolatile memory 100 may be configured to receive and store the result of determination made by a comparator 100a for determining whether the wear amount WE and/or WEx exceeds a threshold WEo and any other information. Then, when a service tool 110 configured to be timely connectable with the nonvolatile memory 100 is connected to the memory 100, the service tool 110 may be configured to load the stored wear amount and/or other information from the memory 100 and display the wear amount and/or other information on a display, or the like, in accordance with a program stored inside. By so doing, the user, or the like, timely checks a current wear amount or the result of determination as to the wear amount using the service tool 110, determines whether repair, replacement, or the like, of the throttle valve is required or is able to forcibly stop vibration damping control or reduce the function of vibration damping control. Note that information about the wear amounts WE and WEx may be referred to at the same time using the service tool, and, in this case, the throttle valve itself may be directly usable; however, it is advantageously easily possible to determine that vibration damping control made by operating the throttle valve should be stopped or reduced.

Estimation of Wear Portion of Throttle Valve and Correction of Vibration Damping Control in Correspondence with Wear Portion Incidentally, as is already described above, in the throttle valve, force or torque acting on the valve body 40 varies depending on the position of the valve body 40 (typically, the wear rate increases as the position of the valve body 40 is distanced from the opening degree center position), so the degree of advance of wear varies depending on the position of the valve body at which valve body vibration corresponding to the compensating component occurs. In addition, for example, when a situation that the accelerator pedal operation amount frequently becomes a specific amount depending on a usage situation of the vehicle, for example, because of a driver's habit, wear at a portion of the throttle opening degree or valve body position corresponding to the frequent accelerator pedal operation amount or in an area close to that portion may early advance as compared with the other portion. In other words, wear of the movable portions of the throttle valve may vary depending on the throttle opening degree or the position of the valve body. Thus, in estimating a wear amount in the device according to the present embodiment, it is applicable that a wear amount is calculated for each position of the valve body, that is, for each throttle opening degree, more specifically, for a movable range of the valve body, that is, for each area in the variation range of the throttle opening degree to thereby make it possible to specify a region of the throttle opening degree or a region of the portion of the valve body at which the advance of wear is early, that is, a wear portion.

Figure 7A:
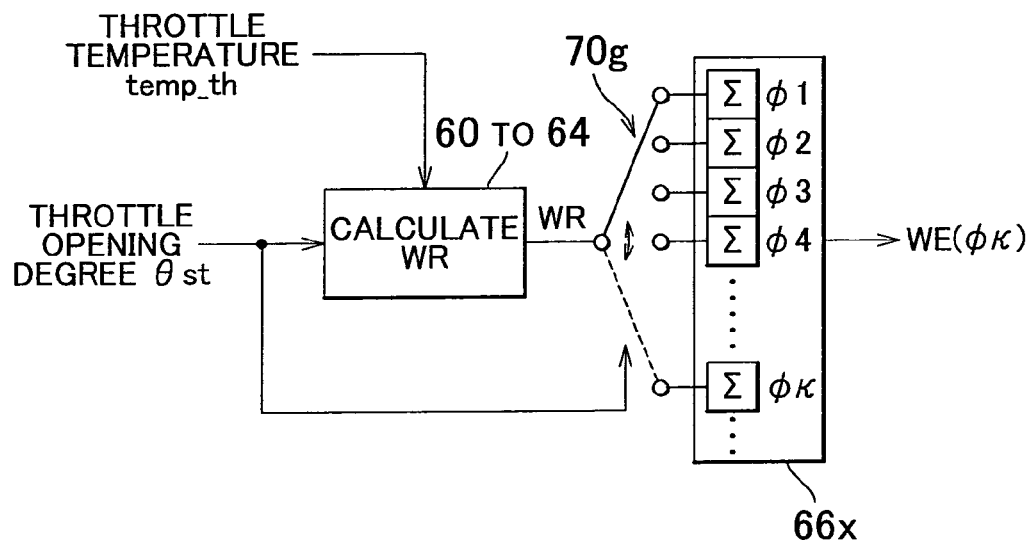
FIG. 7A is a control block diagram of the configuration for calculating a wear amount WE($\phi\kappa$) for each area of a throttle opening degree divided into a plurality of areas in the vibration damping control device according to the embodiment of the invention.
Figure 7B:
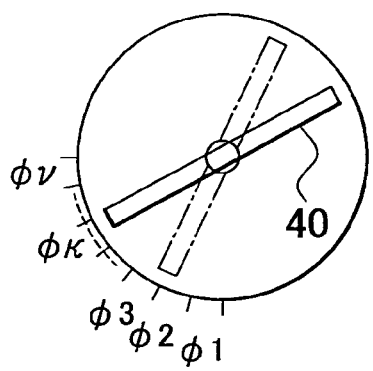
FIG. 7B is a view that illustrates a mode of dividing throttle opening degrees into a plurality of areas.

Specifically, for example, as is schematically shown in FIG. 7B, it is applicable that a plurality of areas ($\phi 1, \phi 2, \phi 3, \ldots \phi \kappa, \ldots$) are set in the variation range of the throttle opening degree and then a wear amount WE($\phi \kappa$) of each area is calculated. More specifically, in the configuration of estimating a wear amount, as illustrated in FIG. 7A, an integrator 66x corresponding to the integrator 66 shown in FIG. 4A and FIG. 4B or FIG. 5A to FIG. 5C is provided for each area of the variation range of the throttle opening degree. Then, a transmission destination of the wear rate WR, calculated in the wear rate calculator 60 to 64 on the basis of the throttle opening degree θst, is switched in the switch 70g in correspondence with the throttle opening degree θst, and the wear rate WR is accumulated in the integrator for the area $\phi \kappa$ to which the throttle opening degree θst at that time belongs. By so doing, the wear amount WE($\phi \kappa$) is sequentially calculated area by area, and it is possible to determine that the area in which the magnitude exceeds a predetermined threshold is a wear portion. Note that the wear rate calculator 60 to 64 may be formed of any configuration shown in FIG. 4A, FIG. 4B, FIG. 5A, FIG. 5B or FIG. 5C, and the wear amount WE($\phi \kappa$) may be a wear amount calculated from all the components of the throttle opening degree or may be a wear amount (WEx) due to the compensating component of vibration damping control.

Figure 6E:
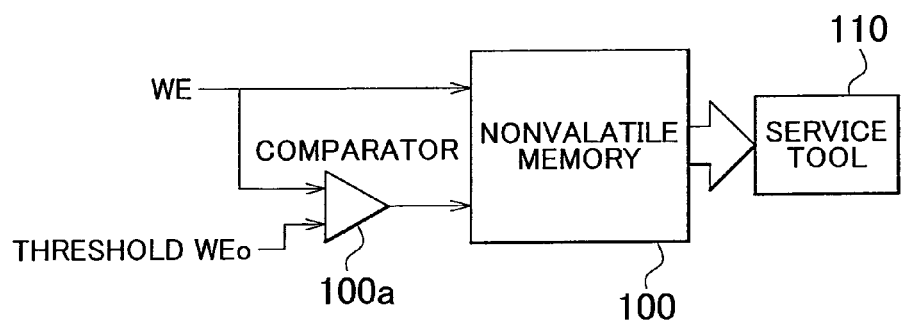
FIG. 6E is a control block diagram of the configuration for outputting a wear amount WE or the determination result to a service tool.
Figure 7C:
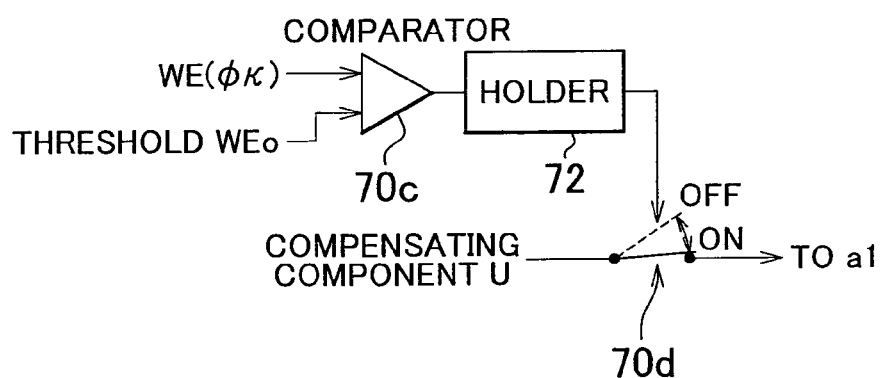
FIG. 7C is a control block diagram of an example of the configuration for controlling whether to execute vibration damping control on the basis of the wear amount WE($\phi\kappa$)

After the wear amounts WE($\phi \kappa$) calculated area by area by the configuration shown in FIG. 7A are output from the integrator 66x (a value of an area corresponding to the current throttle opening degree may be output instead), as in the case of an output of the integrator 66 in the configuration shown in FIG. 4A, FIG. 4B, FIG. 5A, FIG. 5B or FIG. 5C, the wear amounts WE($\phi \kappa$) may be input to the configuration for reducing the magnitude of the compensating component, shutting off the compensating component (stopping vibration damping control) or executing vibration damping control by alternative means (switching to alternative means), shown in FIG. 6A to FIG. 6D, and the same process as that of the mode described in association with FIG. 6A to FIG. 6D may be executed. With the above configuration, when the position of the valve body is placed in the portion or area in which wear has advanced, reducing the magnitude of the compensating component, stopping vibration damping control or switching to alternative means is executed. Note that, in the case where the wear amounts WE($\phi \kappa$) area by area are calculated, it is applicable that, when at least any one of the wear amounts WE($\phi \kappa$) exceeds a predetermined threshold WEo, shutting off the compensating component or executing vibration damping control through alternative means is executed thereafter. In this case, as shown in FIG. 7C, when any one of the wear amounts WE($\phi \kappa$) is determined by the comparator 70c so that WE($\phi \kappa$)>WEo, it is applicable that the information about the determination is held by a holder 72 and then stopping vibration damping control or switching to alternative means is maintained thereafter. In addition, the wear amounts WE($\phi \kappa$) area by area may be stored in the nonvolatile memory 100 shown in FIG. 6E and may be referred to by the service tool 110.

Incidentally, when the vehicle is equipped with a device or configuration that is able to execute intake air flow rate control, other than the throttle valve, (another intake air flow rate control configuration), such as a sub-throttle valve and an EGR device, it is applicable that vibration damping control may be executed using intake air flow rate control in the other intake air flow rate control configuration while avoiding the usage of the throttle opening degree area that is determined to be the wear portion or for which it is determined that the wear amount WE($\phi \kappa$) exceeds a threshold WEo. For example, as shown in FIG. 7E, when the required throttle opening degree falls within an opening degree area (diagonally shaded region) in which WE($\phi \kappa$)>WEo as indicated by the alternate long and short dash line (before offset) in the drawing, the vibrational displacement of the valve body in that area should be avoided; however, when the intake air flow rate at which intake air passes through the throttle valve is "offset" so that the throttle opening degree falls outside the diagonally shaded region in the drawing (after offset) and the other intake air flow rate control configuration is operated so as to compensate for the offset intake air flow rate, vibration damping control may be continued with the required driving power while avoiding the wear portion.

Figure 7D:
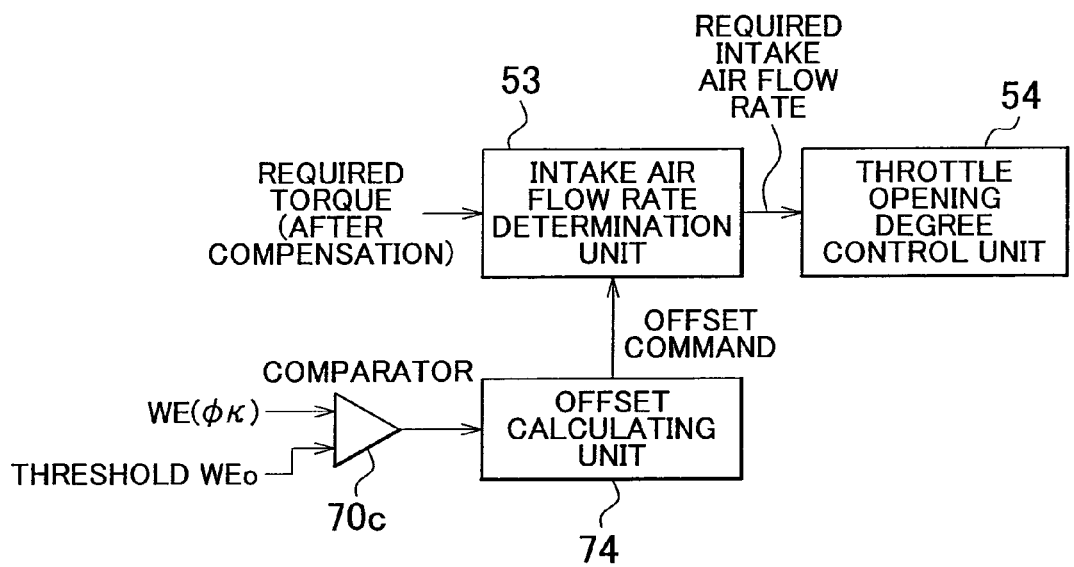
FIG. 7D is a control block diagram of the configuration for offsetting the throttle opening degree on the basis of the wear amount WE($\phi\kappa$) and changing operation of other intake air flow rate regulating means (for example, sub-throttle valve)
Figure 7E:
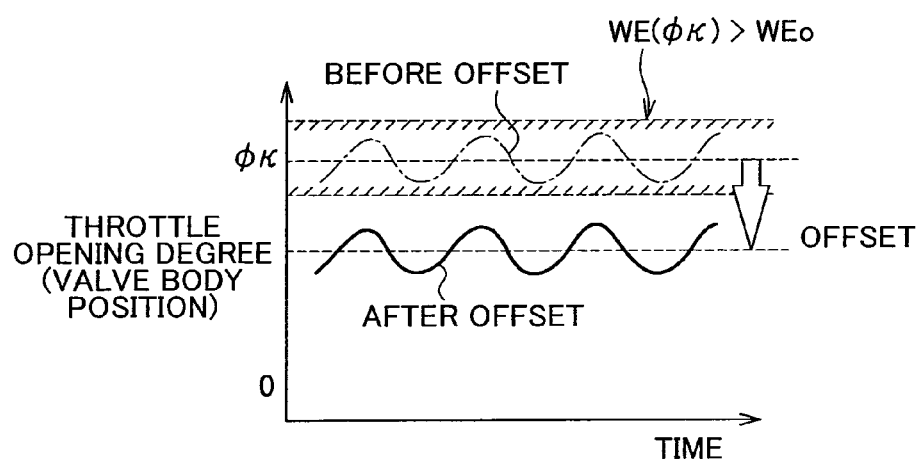
FIG. 7E is a view that illustrates an offset of the throttle opening degree, implemented in the configuration of FIG. 7D.

FIG. 7D shows a configuration for offsetting the intake air flow rate when the required throttle opening degree, that is, the position of the valve body, corresponds to the wear portion as described above. As shown in the drawing, in the configuration that offsets the intake air flow rate, first, it is determined in the comparator 70c whether any one of the wear amounts WE($\phi \kappa$) calculated in FIG. 7A exceeds a predetermined threshold WEo as in the case of the above series of configurations. Here, when it is determined that WE($\phi \kappa$)>WEo, the area $\phi \kappa$ of the position of the valve body, corresponding to the current throttle opening degree θst, is a "wear portion" at which wear has advanced to a considerable degree, and it is undesirable to further vibrationally operate the valve body in that area as described above. Then, when WE($\phi \kappa$)>WEo, the information is transmitted to an offset calculating unit 74, and then, in the offset calculating unit 74, a command for offsetting a required intake air flow rate is determined so that the throttle opening degree corresponding to the required driving torque (after compensation) input to the intake air flow rate determination unit falls outside the area (diagonally shaded region in FIG. 7E) in which WE($\phi \kappa$)>WEo. As the offset command is transmitted to the intake air flow rate determination unit 53, the intake air flow rate determination unit 53 generates a required intake air flow rate that is offset from a value corresponding to the required driving torque in response to the offset command (in FIG. 7E, the required air flow rate is offset downward; however, the required air flow rate may be offset upward) and then transmits the required intake air flow rate to the throttle opening degree control unit 54. By so doing, the valve body operates within the region that falls outside the wear portion or the area in which wear has advanced in accordance with the offset required intake air flow rate to thereby avoid further wear in the wear portion or the area in which wear has advanced. On the other hand, when the above described offset process is carried out, the intake air flow rate in the throttle valve no longer coincides with an amount corresponding to the required driving torque, so the offset calculating unit 74 further issues a command for changing the setting of the corresponding device or configuration to the control device of the sub-throttle valve, EGR device, or the like, to compensate for the offset amount of the intake air flow rate via the throttle valve. By so doing, a torque corresponding to the required driving torque is achieved.

In this way, with the configuration shown in FIG. 7D, generation of driving torque corresponding to the required driving torque is achieved while avoiding operation of the valve body within the wear portion or the throttle opening degree area for which it is determined that the wear amount WE($\phi\kappa$) exceeds the threshold WEo to thereby avoid advance of wear of that portion; whereas execution of vibration damping control is continued. Note that the configuration shown in FIG. 7D compensates for the offset of the intake air flow rate of the throttle valve using means for controlling the same intake air flow rate; however, it is also applicable that any device or means that is able to regulate driving power (for example, engine ignition angle control, intake valve lift control, alternator operation control, or the like) is used to compensate for a variation in driving torque corresponding to the offset amount of the intake air flow rate via the throttle valve. In this case, an offset command from the offset calculating unit 74 may be issued to the device or means that is able to regulate driving power so as to compensate for a variation in driving torque.

As described above, with the above series of configurations, it is possible to appropriately manage the advance of wear of the throttle valve movable portions, and, when wear of the throttle valve movable portions advances to some degree because of a vibrational variation of the throttle opening degree at the time of executing vibration damping control through driving power control, reducing the compensating component of vibration damping control, stopping execution of vibration damping control, using alternative means, offsetting the intake air flow rate, or the like, is carried out to thereby prevent further advance of wear of the throttle valve movable portions. With the above configuration according to the aspect of the invention, it is possible to determine whether to execute vibration damping control while monitoring the wear state of the throttle valve movable portions, so it is possible to sufficiently exhibit the function and advantageous effect of vibration damping control as long as possible while avoiding excessive advance of wear of the throttle valve movable portions. Note that an accumulation of the wear amount may be reset when the throttle valve movable portions are, for example, replaced.

The device according to the embodiment of the invention may be applied to the following cases. For example, the estimated wheel torque in the above embodiment is estimated from a wheel speed; instead, the estimated wheel torque may be estimated from a parameter other than the wheel speed. In addition, the vibration damping control in the above embodiment uses the optimal regulator theory on the assumption that the sprung mass or sprung and unsprung mass movement model is set as the movement model; however, the concept of the invention may be applied to the ones that employ a movement model other than described here or the ones that suppresses vibration through a control method other than the optimal regulator as long as it uses a wheel torque, and the scope of the invention also encompasses such cases. For example, it is applicable that pitch and bounce vibration of the vehicle body is detected from an output value of an in-vehicle G sensor or another sensor that is able to detect pitch and bounce vibration of the vehicle body, and the driving torque or the throttle opening degree is regulated so as to suppress a pitch and bounce vibration component of the vehicle body. In addition, the resonant frequency band of the vehicle body vibration is known to some extent. Then, it is also applicable that driving torque control or throttle opening degree control is carried out so as to extract a fluctuating component of the wheel torque in that band and then to reduce or cancel the fluctuating component.

In addition, in the above embodiment, the operation mechanism of the throttle valve body is of a type in which the valve body is rotated by the throttle motor; instead, it may be of a type in which the valve body is driven by another actuator of which movable portions may wear, such as an electromagnetic solenoid, and it should be understood that the aspect of the invention also encompasses such a case.

Furthermore, it is applicable that a change of state that may change the characteristic of a throttle valve (change of characteristic), such as deformation due to heat at various portions of the throttle valve, is estimated from a start of usage of the throttle valve in the same manner as estimation of the wear state quantity of the throttle valve movable portions according to the above described embodiment, that is, on the basis of a variation of the throttle opening degree and/or a throttle temperature, and the compensating component of vibration damping control is reduced or execution of vibration damping control is stopped on the basis of the change of characteristic by, for example, changing a control gain as in the case of the above embodiment to thereby prevent further advance of the change of characteristic of the throttle valve.

Incidentally, the control configuration that estimates the wear state quantity or the change of characteristic, illustrated in FIG. 4A, FIG. 4B, FIG. 5A, FIG. 5B or FIG. 5C may be used in engine control having a throttle valve, other than vibration damping control, and the aspect of the invention also encompasses such a case. In the control configuration that estimates the wear state quantity or the change of characteristic, even when a start button or an ignition switch is turned off, a nonvolatile storage device that stores the history of operation of the throttle valve till then or the change of characteristic till then is provided. In addition, the configuration for providing information about the wear amount as illustrated in FIG. 6E may be configured as a device that provides information about the change of characteristic of the throttle valve, other than the wear amount, and the configuration may be a device independent of the vibration damping control device. Furthermore, the configuration that estimates the wear portion as illustrated in FIG. 7A may also be a device independent of the vibration damping control device.

Another embodiment of the invention will be described below.

Another embodiment relates to a vibration damping control method for a vehicle, which executes vibration damping control in which driving power of the vehicle is controlled to suppress pitch or bounce vibration of the vehicle. The control method includes controlling driving torque of an engine and varying the magnitude of a compensating component that compensates a wheel torque. In control of the engine driving torque, the amplitude of the pitch or bounce vibration is suppressed on the basis of a wheel torque that is generated at a contact portion at which a wheel of the vehicle contacts a road surface and that acts on the wheel. In varying the magnitude of a compensating component that compensates a wheel torque, the magnitude of the compensating component that is calculated by the vibration damping control unit and that compensates the wheel torque for the vibration damping control is varied on the basis of a change of characteristic of a movable portion of a throttle valve of the engine.

The above described configuration according to the aspect of the invention will be described below.

The aspect of the invention may provide a vibration damping control device that is equipped for a vehicle and that uses driving power control. More specifically, it is possible to provide a device that is able to manage a change of characteristic, such as a wear state, of throttle valve movable portions so that the change of characteristic, such as wear, of the throttle valve movable portions does not exceed an allowable limit before the vehicle reaches the end of the service life.

In addition, the above vibration damping control device may be configured to refer to the change of characteristic, such as the degree of wear, of the throttle valve movable portions to thereby correct a control mode so that the change of characteristic does not excessively advance.

Furthermore, it is possible to provide a device that is configured so that the advance of wear or degree of change of another characteristic of the throttle valve movable portions is calculated or estimated during running of the vehicle and a control mode is corrected on the basis of the degree of wear or the degree of change of another characteristic or execution of control is stopped when the degree of wear or the degree of change of another characteristic reaches a predetermined extent to thereby avoid excessive advance of wear or the change of another characteristic of the throttle valve movable portions during usage of the vehicle.

In addition, it is possible to provide a new configuration that estimates an index value indicating the state (advance) of wear or the change of another characteristic of the throttle valve movable portions.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A vibration damping control device for a vehicle, which executes vibration damping control in which driving power of the vehicle is controlled to suppress pitch vibration or bounce vibration of the vehicle, the vibration damping control device comprising:
a vibration damping control unit that controls a driving torque of an engine so as to suppress the amplitude of the pitch vibration or bounce vibration on the basis of a wheel torque that is generated at a contact portion between a wheel of the vehicle and a road surface and that acts on the wheel, and that calculates a compensating component for compensating the wheel torque for the vibration damping control; and
a compensating component regulating unit that varies the magnitude of the compensating component on the basis of a wear state quantity of a movable portion of a throttle valve of the engine.

2. The device according to claim 1, wherein the compensating component regulating unit reduces the magnitude of the compensating component on the basis of the wear state quantity.

3. The device according to claim 2, wherein the compensating component regulating unit sets the magnitude of the compensating component to 0 when the wear state quantity has reached a predetermined threshold.

4. The device according to claim 2, wherein the wear state quantity is determined on the basis of a variation of an opening degree of the throttle valve.

5. The device according to claim 4, wherein the wear state quantity is estimated on the basis of an accumulated value of the variation of the opening degree of the throttle valve.

6. The device according to claim 4, wherein an increase in the wear state quantity varies depending on the opening degree of the throttle valve.

7. The device according to claim 6, wherein the increase in the wear state quantity reduces as a position of a valve body of the throttle valve approaches an opening degree center position at which no spring force of a return spring acts.

8. The device according to claim 1, comprising:
a wear state quantity estimating unit that estimates the wear state quantity of the movable portion of the throttle valve of the engine on the basis of a variation of an opening degree of the throttle valve, wherein the compensating component regulating unit uses the wear state quantity to determine the magnitude of the compensating component of the driving power.

9. The device according to claim 8, wherein the wear state quantity is estimated on the basis of an accumulated value of the variation of the opening degree of the throttle valve.

10. The device according to claim 8, wherein an increase in the wear state quantity reduces as a position of a valve body of the throttle valve approaches an opening degree center position at which no spring force of a return spring acts.

11. The device according to claim 1, further comprising:
a characteristic change information providing unit that provides information about the wear state quantity of a throttle valve of the engine,
wherein the compensating component regulating unit uses the information to determine the magnitude of a compensating component of the driving power.

12. The device according to claim 1,
wherein the wear state quantity of the throttle valve of the engine of the vehicle due to the vibration damping control and the wear state quantity of the throttle valve due to normal throttle valve control are separately managed.

13. The device according to claim 12, wherein the wear state quantity of the movable portion of the throttle valve of the engine due to operation of the throttle valve based on the compensating component is calculated on the basis of a component that is obtained by adding a vibration component based on the compensating component in a variation of the throttle opening degree to a variation of the vibration component at a vibration center position.

14. The device according to claim 12, wherein the wear state quantity of the movable portion of the throttle valve of the engine due to operation of the throttle valve based on the compensating component is given by subtracting a wear state quantity determined on the basis of a throttle opening degree or driving control amount corresponding to driving power that is not compensated by the compensating component from a wear state quantity determined on the basis of a throttle opening degree or driving control amount corresponding to driving power that has been compensated by the compensating component.

15. The device according to claim 1, wherein a magnitude of a compensating component that compensates a wheel torque for the vibration damping control is reduced when a required throttle opening degree corresponds to a region of the portion of the valve body at which the advance of wear is early.

16. The device according to claim 1, wherein when the wear state quantity exceeds a predetermined amount, the driving power is regulated by at least one selected from the group consisting of ignition angle control of the engine, intake valve lift control and alternator operation control.

17. A vehicle that controls an opening degree of a throttle valve so as to suppress a vibration component input from a road surface, wherein control of the throttle valve for suppressing the vibration component is changed on the basis of a wear state quantity of a movable portion of the throttle valve.

18. The vehicle according to claim 17, wherein a variation of the opening degree of the throttle valve is reduced when the wear state quantity of the movable portion of the throttle valve is high as compared with when the wear state quantity is low.

19. A vibration damping control method for a vehicle, which executes vibration damping control in which driving power of the vehicle is controlled to suppress pitch vibration or bounce vibration of the vehicle, the vibration damping control method comprising:

calculating a required driving torque that is a torque required of the vehicle;
calculating a wheel torque that is generated at a portion at which a wheel of the vehicle contacts a road surface and that acts on the wheel;
calculating a wear state quantity of a movable portion of a throttle valve of an engine; and
varying the required driving torque so as to suppress the amplitude of the pitch vibration or bounce vibration on the basis of the required driving torque, the wheel torque and the wear state quantity.

20. The method according to claim 19, wherein
the wear state quantity of the movable portion of the throttle valve of the engine is calculated on the basis of a variation of an opening degree of the throttle valve; and
the method further comprising:
determining the magnitude of a compensating component of driving power of the engine on the basis of the wear state quantity.

21. The method according to claim 20, further comprising:
reducing the variation of the opening degree of the throttle valve when the wear state quantity is higher than a predetermined value.

22. The method according to claim 20, further comprising:
reducing the magnitude of the compensating component that compensates a wheel torque for the vibration damping control when a required opening degree of the throttle valve corresponds to a wear portion of a movable portion of a throttle valve of an engine.

* * * * *